United States Patent [19]
Nishibori et al.

[11] Patent Number: 5,323,971
[45] Date of Patent: Jun. 28, 1994

[54] PULVERIZING, SEPARATING, AND SIZE REGULATING MOLDED RESIN ARTICLES

[75] Inventors: Sadao Nishibori; Yuzp Itakura, both of Tokyo, Japan

[73] Assignee: Ein Co., Ltd., Kamakura, Japan

[21] Appl. No.: 965,116

[22] Filed: Oct. 22, 1992

[30] Foreign Application Priority Data

| Nov. 15, 1991 | [JP] | Japan | 3-326705 |
| Nov. 15, 1991 | [JP] | Japan | 3-326706 |
| Mar. 13, 1992 | [JP] | Japan | 4-088264 |
| Mar. 13, 1992 | [JP] | Japan | 4-089783 |

[51] Int. Cl.$^5$ ............................................. B02C 19/12
[52] U.S. Cl. .................................. 241/3; 241/24; 241/29; 241/152.2; 241/156; 241/261.1
[58] Field of Search .................. 241/3, 24, 29, 246, 241/253, 261.1, 152.2, 156, 161, 164

[56] References Cited

U.S. PATENT DOCUMENTS

| 3,706,419 | 12/1972 | Phillips et al. | 241/220 |
| 3,957,214 | 5/1976 | Berggren | 241/246 |
| 4,008,858 | 2/1977 | Yamada et al. | 241/101.2 |
| 4,022,638 | 5/1977 | Weet | 241/24 X |
| 4,131,238 | 12/1978 | Tarpley, Jr. | 241/1 X |
| 4,580,733 | 4/1986 | Nakagomi | 241/260.1 X |
| 5,129,588 | 7/1992 | Toshio et al. | 241/100 X |

FOREIGN PATENT DOCUMENTS

| 433702 | 9/1926 | Fed. Rep. of Germany | 241/246 |
| 288260 | 3/1991 | German Democratic Rep. | 241/29 |
| 16879 | 2/1977 | Japan | 241/24 |
| 27164 | 3/1978 | Japan | 241/24 |
| 27165 | 3/1978 | Japan | 241/24 |
| 207771 | 10/1985 | Japan | 241/24 |
| 2243305 | 9/1990 | Japan | 241/3 |
| 289137 | 2/1953 | Switzerland | 241/246 |
| 585875 | 12/1977 | U.S.S.R. | 241/261.1 |
| 627859 | 10/1978 | U.S.S.R. | 241/261.1 |
| 1473848 | 4/1989 | U.S.S.R. | 241/253 |

Primary Examiner—Mark Rosenbaum
Assistant Examiner—Frances Han
Attorney, Agent, or Firm—Joseph C. Mason, Jr.; Ronald E. Smith; Masaaki Ogura

[57] ABSTRACT

The materials to be treated, for instance, molded resin articles with resin films coated thereon are treated by relatively simple means to separate and remove the resin film coatings from the surfaces thereof, and are further treated to recover them as a raw-form of resin material or a resin material regulated such that its particle diameter lies within a given particle diameter range, or the materials to be treated, for instance, powder materials are pulverized and granulated. A molded resin article is crushed to small pieces, to which compression impacts based on fine vibrations are in turn applied for squeezing, and resin film coatings separated off the small pieces are removed. The thus treated small pieces are further re-pulverized, and frictional crushing impacts are applied to the thus pulverized pieces as well for polishing and size-regulation. Alternatively, directional fine vibrations are applied to one of the inner and outer compression impact surfaces of inner and outer compression impact members that are located in opposition to each other with a given gap between them to pulverize and squeeze the material to be treated that is fed between the compression impact surfaces, thereby separating surface thin films therefrom for granulation.

33 Claims, 11 Drawing Sheets

F I G. 12
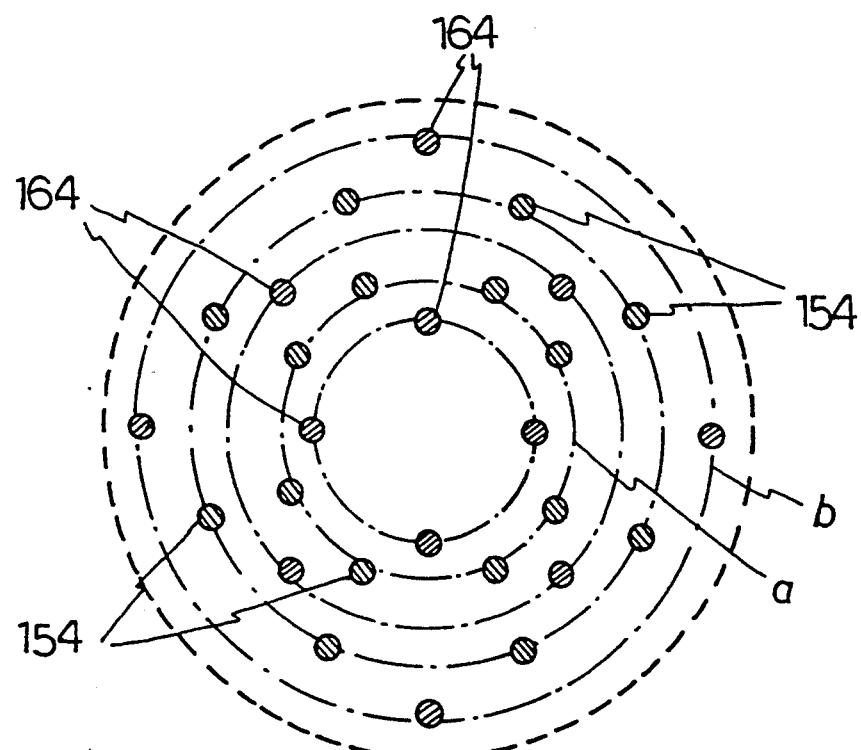

PULVERIZING, SEPARATING, AND SIZE REGULATING MOLDED RESIN ARTICLES

BACKGROUND OF THE INVENTION

1. Field of the Invention

This invention relates to a process for pulverization and separation and a process for pulverization, separation and size-regulation as well as an apparatus for pulverization and separation, an apparatus for pulverization and granulation or pulverization, separation and granulation and an apparatus for polishing and size-regulation.

More specifically, the present invention is applicable to:

A pulverizing and separating process in which a variety of molded resin articles covered on their surfaces with resin films composed mainly of a resin material for decorating and/or protecting purposes are crushed into a plurality of a coarse particle-form of small pieces and the resin films are separated and removed from the small pieces to regenerate them as a raw-form of resin material;

A pulverizing, separating and size-regulating process wherein the resin material mentioned above is regulated to a suitable particle size, if required, to regenerate it in the form of a resin material comprising particles lying in a given particle diameter range, so that second-mentioned resin material can be recycled;

A pulverizing and separating process wherein a conductive material such as copper or aluminum is separated by pulverization from a covering material that is used with insulating electrical wires or cords, for instance, vinyl chloride, crosslinked polyethylene or synthetic rubber;

A separating process wherein plastics that are insulators for various components such as computer or word processor components are separated from metals that are conductors inclusive of semiconductors or a process for separating insulators from conductors;

A pulverizing and separating apparatus which can be used to treat resin materials;

An apparatus for separating and removing the resin films from the coarse particle-form of small pieces, or for crushing molded powder articles including a relatively hard, molded resin article (that may also hereinafter be referred to simply as the powder articles) to obtain a plurality of a coarse particle-form of materials including a relatively hard resin material (that may also hereinafter be referred to simply as the powder materials) and pulverizing or frictionally crushing the powder materials within a given particle diameter range or to a given thickness; and A pulverizing and granulating or pulverizing, separating and granulating apparatus and a polishing and size-regulating apparatus wherein molded powder articles including a relatively soft, molded resin article (that may also hereinafter be referred to simply as the molded powder articles) are crushed to obtain a coarse particle-form of powder materials including a relatively soft resin material and the powder materials can then be regulated in terms of size and granulated.

2. Description of the Prior Art

Generally, resin articles shaped and formed of resin materials such as a variety of naturally occurring or synthetic resins are now used in many applications, both in many types and in large amounts, incidental to a variety of life styles. At present, however, such various problems as mentioned below arise in connection with their post-use treatments.

As well known in the art, most resin materials constituting molded resin articles are characterized by their own properties, i.e. they have excellent water resistance and weather resistance and are difficult to corrode, but they spew about large amounts of harmful gases and fumes that are undesired in view of society and environment, for instance, when incinerated in an incinerator for disposal purposes. In addition, there is a disadvantage that uncombusted components of the resin material melt during incineration and are deposited onto the inner wall of the incinerator, presenting a risk of doing damage to it. Warding off this defect may be achieved by burying the molded resin articles underground. However, since they remain uncorroded over an extended period, they appear to present another factor for environmental disruption.

On the other hand, such resin materials will yearly be exhausted due to resource depletion, and it is now demanded and recognized that the post-use resin materials must be recycled without disposal. For such recycling or regenerating purposes, what types of resins are used are indicated on the molded resin articles.

Usually or in most cases, molded resin articles to be recycled for the recycling purposes mentioned above are provided on their surfaces with resin films for decorating, that is to say, polishing, matting and coloring purposes or with a view to improving their properties such as wear resistance and weather resistance much more considerably or, in other words, protecting them. As an example, about 75% by weight material of a car is now recycled, but most of it is a metal material and the rest or 25% is rejected in the form of dust, in which about 30% by weight of plastics are contained. For instance, bumper parts for various vehicles are usually produced by applying a polyester urethane type coat of about 15 $\mu$m to 30 $\mu$m in thickness onto a substrate member made of polypropylene and having a thickness of about 2.5 mm to 5 mm.

Generally, the resin films coated on the surfaces of the molded resin articles are formed with the use of resin materials differing from those forming such articles in terms of type and properties, or alternatively formed of resin materials of different colors. When such resin materials of varying types and with varying properties and colors are recycled as such, not only are articles obtained by this recycling much inferior in terms of mechanical properties such as impact strength, but any surface smoothness and color as desired cannot be obtained as well.

Until now, the molded resin articles to be recovered have usually been recycled for each resin material having the same type and properties with the foregoing in mind.

However, the resin films coated on the surfaces of molded resin articles are so relatively thin and have such strong adhesion strength that they cannot easily peel off; that is, they are likely to have various undesired properties and so are not well suited for mechanical treatments; thus throughputs are low even when relying upon mechanical peeling and discriminating means such as well-known shot blasting. Another disadvantage is that when it is intended to peel and discriminate off such resin films by pulverizer means such as ball-milling, they cannot easily peel off, because they melt by frictional heat during pulverization.

For instance, when it is intended to feed the materials to be treated into a specific treating zone through a feeding opening such as a hopper, the materials build up even in the hopper and so agglomerate to provide a solid matter that is not fed into the hopper in a stable manner. To add to this, there may be another disadvantage that clogging or other trouble is likely to occur among the individual materials to be treated in the treating zone.

In order to subject the resin materials differing in type and properties to a separation-by-dissolution treatment with the use of an organic solvent that allows them to be associated with each other, it is required that the polypropylene material itself be denatured, and the need of using a melting-by-heating step or other additional steps lowers throughputs. This in turn causes treating equipment to be excessively increased in size, offering an economical problem and, besides, poses much difficulty due to the need of post-treatments such as the step of neutralizing the used solvent.

The problems associated with the recovery of the resin materials mentioned above, for the most part, are true of other powder materials as well.

In some cases, resin films must be released and removed from such articles of resin material as mentioned above, for example, resin materials deposited with said resin films on them or powder materials containing resin materials alone. When the material to be treated is so relatively hard that it must be pulverized within a given particle diameter range, or when it is relatively soft, it is often required to be granulated with the particle diameters lying within a given range. In addition, these operations should be carried out by a single treating apparatus. However, there is still no treating arrangement meeting and accommodating such demands, although this is partly because of such considerations as mentioned above.

Further, when it is intended to recycle copper, aluminum or other material that are conductors by removing a covering insulator material from insulated electrical wires or cords, the conductor portions are pulled out of the covering material while it is torn in the lengthwise direction. Alternatively, lengthwise cutouts are provided in the covering material, and the wires or cords are then cut to a given length. After that, torsion is induced in the cut wires or cords to separate the covering material from the conductors.

When the covering material is combustible, it is attempted to burn off that material completely in an incinerator as well.

Conventional means for removing covering insulator materials physically or torsionally have some defects or, in other words, they are low in separation efficiency or are impractical.

Burning off the covering material that is an insulator is easy to carry out, but poses some problem, i.e., gives rise to spewing about harmful gases or large amounts of fumes and reducing the serviceability of the furnace.

In the case of computers and word processors no longer suitable for use, a number of conductors inclusive of semiconductors and other parts incorporated in them are simply thrown away with them. As well known in the art, many metals such as semiconductors are used while molded with plastics that are conductors, and so are desired to be recovered and recycled in view of making effective use of resources. However, never until now are any effective means meeting such demand proposed.

SUMMARY OF THE INVENTION

Having been accomplished chiefly to provide a solution to the problems associated with the prior art, the present invention has for its object to provide a process for pulverization and separation, a process for pulverization, separation and size-regulation and an apparatus for pulverization and separation, which enable the material to be treated, for instance, a molded resin article to be cleared of a resin film coated on its surface by a relatively simple means, whereby the resin film can be recovered as a raw-form of resin material or, if required, can be regulated to particle diameters lying in a given particle diameter range for recovery.

Another object of the invention is to provide an arrangement for pulverizing and granulating or pulverizing, separating and granulating the material to be treated, for instance, powder materials including resin materials or other powder materials, which, in a narrow sense, enable, for instance, a resin film to be separated and removed from a coarse particle-form of small pieces and, in a broad sense, enable the material to be treated, for instance, a relatively hard, molded powder article to be crushed to obtain coarse particles to be further pulverized or alternatively the material to be treated, for instance, a relatively soft, molded powder article to be crushed into coarse particles, which are then regulated in terms of size and granulated.

Further, the present invention has also been accomplished to solve the problems associated with such releasing and removal of resin films as mentioned above, and to meet some demand in respect of the pulverization and granulation of the material to be treated, for instance, powder materials including resin materials. To put it another way, a further object of the invention is to provide a pulverizing and granulating apparatus which enables the material to be treated to be cleared of a resin film coated thereon by a relatively simple and ready means, thereby recovering it as a raw-form of resin material or, if required, further granulating it in the form well fit for recycling, or alternatively enables the material to be treated, for instance, a powder material including a resin material, to be pulverized or granulated.

In view of the inconvenience incidental to the conventional treatment of insulated electrical wires or cords, still further objects of the invention are to provide a process for achieving separation between a conductor and an insulator, which enables a conductor portion to be surely and easily separated from the insulator without posing any problem such as environmental pollution whatsoever, and a process for achieving separation between plastics and metals including semiconductors for recovery purposes, which form various parts of computers and word processors.

According to the pulverizing and separating process of the invention and the pulverizing, separating and size-regulating process of the invention, the objects mentioned above are achieved by crushing the material to be treated, for instance, a molded resin article, into a plurality of minuscule pieces, and then applying to them a compression impact based on fine vibrations to break them under pressure, thereby recovering a raw-form of resin material in which resin films are removed from the surfaces of the minuscule pieces by such pressure-breaking, or by applying an impact type frictional crushing force to the minuscule pieces from which the resin films have been removed for polishing purposes, thereby recovering a resin material having a regulated surface, or re-pulverizing the minuscule pieces, then regulating the particle diameters of the thus re-pulverized particles in a given particle diameter range and applying an impact type frictional crushing force to the pulverized pieces for polishing purposes, thereby recovering a resin material with the particle diameters lying in a given particle diameter range. According to the above-mentioned pulverizing and separating process of the invention, it is also possible to cut and crush a material in which a conductor is covered with an insulator, for instance, an insulated electrical wire or cord or a semiconductor molded with plastics and then apply a compression impact to the thus cut wire or other material, thereby driving the conductor out of the insulator.

The pulverizing and separating apparatus of the invention is also designed to apply fine vibrations or directional fine vibrations to compression impact surfaces that are located in opposition to each other with a given gap between them, so that the small pieces fed between the compression impact surfaces can be squeezed by said fine vibrations or directional fine vibrations. Further, in the pulverizing and granulating or pulverizing, separating and granulation apparatus according to the invention and the polishing and granulating apparatus according to the invention, the inner compression impact surface of an inner compression impact member is located in opposition to the outer compression impact surface of an outer compression impact member with a given gap between them, and at least one of these inner and outer compression impact members is provided with directional fine vibrations that are controlled in consideration of how the material to be treated is treated and the properties and nature of said material, so that the material to be treated, for instance, a molded resin article, fed between these inner and outer compression impact surfaces can be pulverized or granulated by compression impacts based on said directional fine vibrations.

Still further, the present invention provides an apparatus for polishing and granulating the material to be treated, for instance, a powder material, which includes fixed polishing and size-regulating means that lies on a fixed disc member with the central region communicating with a inlet opening for the material to be treated and is provided with a series of fixed pins in a plurality of rotational orbits, movable polishing and size-regulating means that lies on a rotatable disc member capable of being rotationally driven in opposition to said fixed disc member and is provided with a series of movable pins in a plurality of rotational orbits different from those for said fixed pins, and sorting means that lies on the outer periphery of the combined fixed/movable pins for arbitrarily sorting out the material having a desired or lower particle size and communicates with a discharge port, and removal means for removing the material having a desired or higher particle size through a removal port, said material to be treated being capable of being polished and size-regulated between said fixed pins and said movable pins.

BRIEF DESCRIPTION OF THE DRAWINGS

For a fuller understanding of the nature and objects of the invention, reference should be made to the following detailed description, taken in connection with the accompanying drawings, in which:

FIG. 12 is a front view for illustrating the polishing and size-regulating actions in FIG. 11.

DETAILED DESCRIPTION OF THE PREFERRED EMBODIMENTS

In the ensuing disclosure, the term "resin material" refers to a resin material to be recovered from a molded resin article; the word "crushing" to breaking or cutting for obtaining the small piece or material to be treated, which is well fit for the treatments according to the invention in terms of shape and size; the word "separation" to removing and separating a resin film and an insulator from the surface of the small piece to be treated; the term "size regulation" to regulating the small piece to be treated, from which the resin film has been removed, or the material to be treated, to a size that lies in a given particle diameter range and is well fit for recycling as by polishing or cutting, or alternatively regulating the minuscule piece to be treated, from which the resin film has been removed, or the material to be treated, to a given size by chamfering the corners thereof as by polishing or cutting; the term "powder material" to, in a broad sense, a powder material to be recovered from molded powder articles formed of ceramic materials including resin materials, a powder material that is relatively hard and easy-to-pulverize powder piece or lump, or a powder material that is relatively soft and easy-to-granulate piece or lump; the word "pulverization" to pulverizing the material to be treated, for instance, a piece or lump crushed to a size suitable for the treatments of the invention, and is understood to include frictional crushing in a broad sense; and the word "granulation" to granulating the material to be treated, which has been crushed, with a given thickness or a given particle diameter range, or alternatively regulating the above-mentioned relatively soft material to be treated to a given thickness or a given particle diameter range suitable for recycling.

FIGS. 1 THROUGH 3

Figure 1:
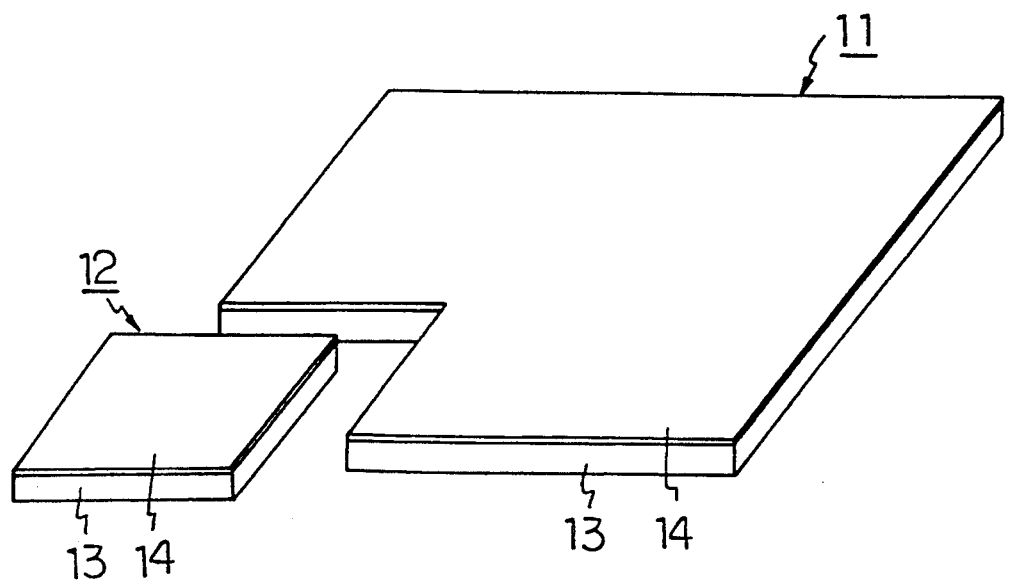
FIG. 1 is a perspective view that provides a conceptual and schematic representation of one example of the molded resin article which is to be treated by the present invention and one example of the small piece obtained by crushing said molded resin article.

FIG. 1 is a perspective view that provides a conceptual and schematic representation of one example of the molded resin article to be treated and one example of the small piece to be treated, which is obtained by crushing that resin article, for instance, a bumper member applicable to a variety of vehicles or carriers and one example of the small piece to be treated, which is obtained by crushing that bumper.

Referring now to FIG. 1, the molded resin article 11 to be treated is made up of a basic or substrate member 13 (that will hereinafter be chiefly referred to as the resin material to be recovered) formed of a first resin material (for instance, polypropylene in the case of a vehicle's bumper member) and a resin film 14 (that will hereinafter be chiefly referred to as the resin film to be removed) coated on the front side of the basic member 13, which is formed by a resin coating material composed mainly of a second resin material (for instance, polyurethane in the case of a vehicle's bumper member). As illustrated, the resin article 11 is optionally crushed to small pieces of the desired size or, in this case, the small pieces 12 to be treated.

According to the present invention, the small pieces 12 are basically treated, as mentioned below. More illustratively, the resin film 14 to be removed is completely released from the resin material 13 to be recovered, which forms each small piece 12, whereby said resin material 13 is immediately recovered as a raw-form of resin material. Alternatively, that raw-form of resin material 13 is subsequently size-regulated in a form suitable for recycling or in a given particle diameter range, whereby it is recovered as the size-regulated, particulate resin material 15 (FIG. 4) (that will hereinafter be chiefly called the size-regulated resin material to be recovered), as will be described later.

The molded resin articles 11 that can be treated by the invention include not only the car's bumper member mentioned above but also any molded resin articles that may be formed of any recoverable and recyclable, naturally occurring resin or synthetic resin materials by any desired molding or forming means and have at least on parts of their surfaces coated films for decorative, say, polishing, matting and coloring purposes or protective, say, wear-resistant and weather-resistant purposes, said coated films being releasable from said molded resin articles by the application of compression impacts.

The small pieces 12 to be treated may be those obtained by crushing molded resin article 11 to the required size as by a cutter mill 201 (FIG. 2), as will be described later. In the case of the bumper member mentioned above, for instance, the substrate member of polypropylene having a thickness of about 2.5 mm, which is coated with a polyurethane film of 25 $\mu$m in thickness, could be cut or otherwise crushed to a piece of about 20×20 mm in size.

In what follows, reference will be made to the means for treating the molded resin article 11 to recover the resin material 13 or the size-regulated resin material 15.

Figure 2:
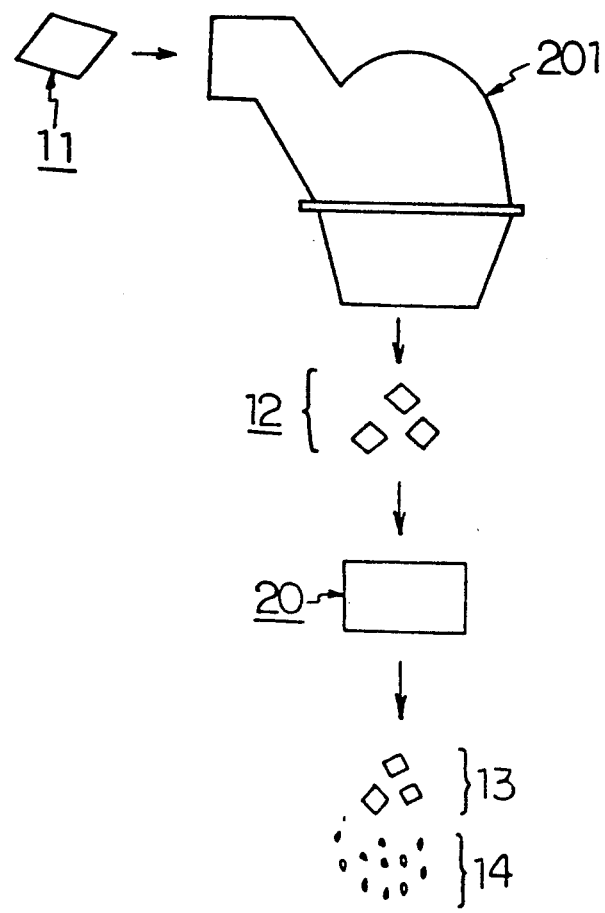
FIG. 2 is a schematic representation of the general aspect of the basic, first embodiment of the process for pulverizing and separating a resin material that is an example of the material to be treated by the invention and the process for pulverizing, separating and size-regulating that resin material.
Figure 3:
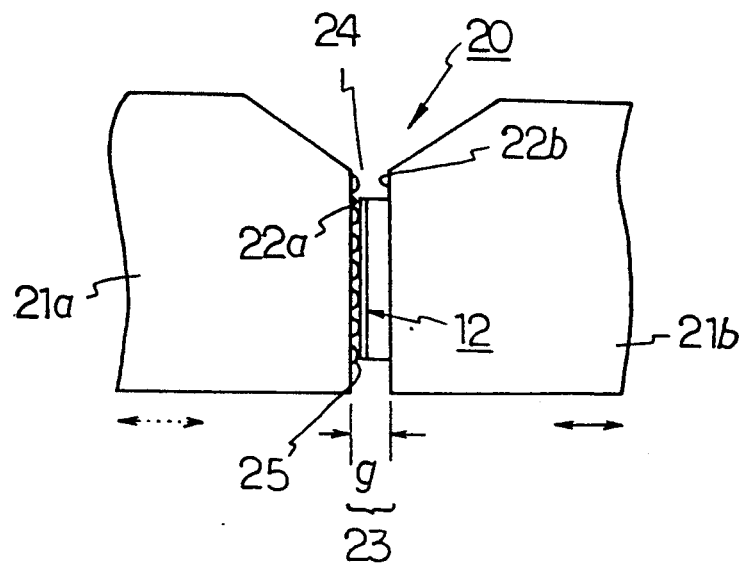
FIG. 3 is a schematic representation of the first compression impact applicator as the first apparatus embodiment used in the above-mentioned first embodiment.

As already stated, FIG. 2 is a series of views of the treating steps, which provides a principal and schematic representation of the general aspect of the basic, first embodiment of the present process for pulverizing and separating a resin material and the present process for pulverizing, separating and size-regulating that resin material, and FIG. 3 is a diagrammatic view that provides a schematic representation of the general aspect of the first compression impact applicator as the first apparatus embodiment which, according to the first process mentioned above, applies a compression impact to the small piece 12 obtained by crushing the molded resin article 11, so that the article 11 can be extended to peel off the resin film coated on its surface, thereby recovering the resin material 13.

When the basic, first process embodiment mentioned above is practically used, applying the required compression impact to the small piece 12 obtained by crushing the molded resin article 11 as by the cutter mill 201 is achieved by using the first apparatus embodiment shown in FIG. 3, i.e., a first compression impact applicator 20 that applies the compression impact to the small piece 12 to release and remove the resin film 14 from the resin material 13 to be recovered.

In the apparatus embodiment shown in FIG. 3, the first compression impact applicator 20 includes a pair of compression impact-applying members 21a and 21b having compression impact-applying surfaces 22a and 22b that are spaced away from each other with a given gap g between and extend parallel with each other to define a compression impact-applying zone 23 and a feeding opening 24 that is located above the compression impact-applying members 21a and 21b and through which the crushed small pieces 12 are fed seriatim. At least one of the compression impact-applying members 21a and 21b or, in the instant embodiment, the compression impact-applying member 21b is finely vibrated with respect to the other or the compression impact-applying member 21a in a continued manner, using any known vibrator (not shown). Alternatively, they may be finely vibrated in a continued manner, as shown by a broken line double-arrow.

In the basic, first process embodiment mentioned above, while fine vibrations are applied between the compression impact-applying members 21a and 21b, that is, the compression impact-applying surfaces 22a and 22b of the first compression impact applicator 20, the small pieces 12 to be treated are fed seriatim through the upper opening 24, whereby the compression impacts resulting from fine vibrations are continuously applied to them in the compression impact-applying zone 23 between the compression impact-applying surfaces 22a and 22b, causing them to receive the required squeezing and elongating actions, whereby the resin material 13 to be recovered is easily cleared of, and separated from, the resin film 14 coated thereon due to variations in the internal stresses applied to the resin material 13 and resin film 14 forming the small pieces 12, for instance, due to a difference in the internal stresses between the resin material 13 that is relatively easy to squeeze and elongate and the resin film 14 that is relatively difficult to squeeze and elongate, followed by the downward discharging of both the resin materials. Since the resin film 14 is separated and removed from the resin material 13 in this manner, the resin material 13 can be recovered in the form of a raw-form of resin material, as desired.

If either of the compression impact-applying surfaces 22a and 22b of the compression impact-applying members 21a and 21b is provided with a group of discrete projections 25, then easier and more efficient removal of the resin film 14 from the resin material 13 could be achieved In connection with the first process embodiment, it is noted that while peeling the resin film 14 off the resin material 13, which form together the small pieces 12 to be treated, has been described as occurring only through the squeezing action incidental to the application of the compression impact between the compression impact-applying surfaces 22a and 22b of the first compression impact applicator 20, it is not always required to make use of the first compression impact applicator 20 alone; in other words, any equipment of other construction may be used as well, if it provides peeling means that can apply compression impacts based on fine vibrations to the small pieces 12 to be treated, in a continuous manner as needed, so that they can be squeezed and elongated.

Figure 6:
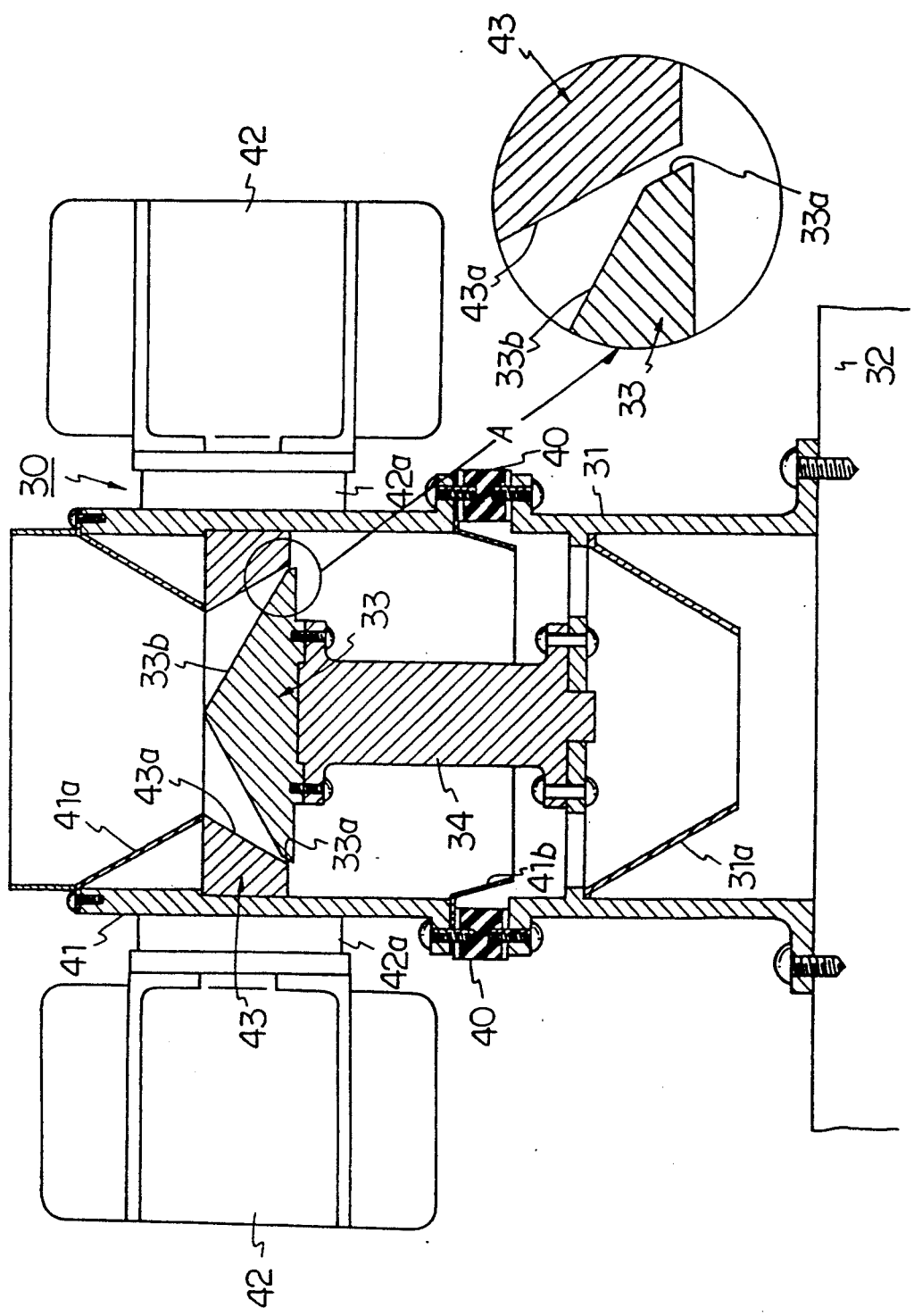
FIG. 6 is a longitudinally sectioned view that provides a schematic representation of the combined compression impact applicator/granulator that is the second pulverization and granulation or pulverization, separation and granulation apparatus for the material to be treated as the second equipment embodiment used in each of the second and third embodiments of the invention, in which a portion shown at A is partly enlarged.
Figure 7:
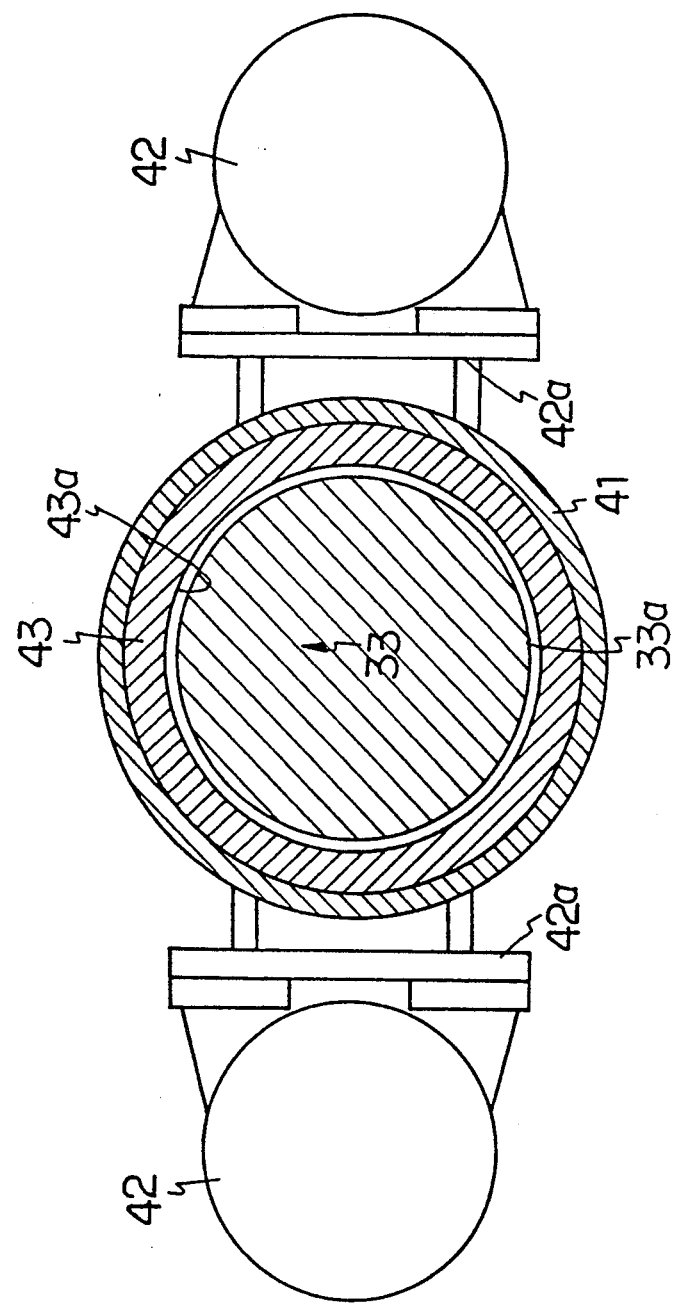
FIG. 7 is a cross-sectional view showing part of the arrangement shown in FIG. 6.

FIGS. 6 and 7

Figure 8:
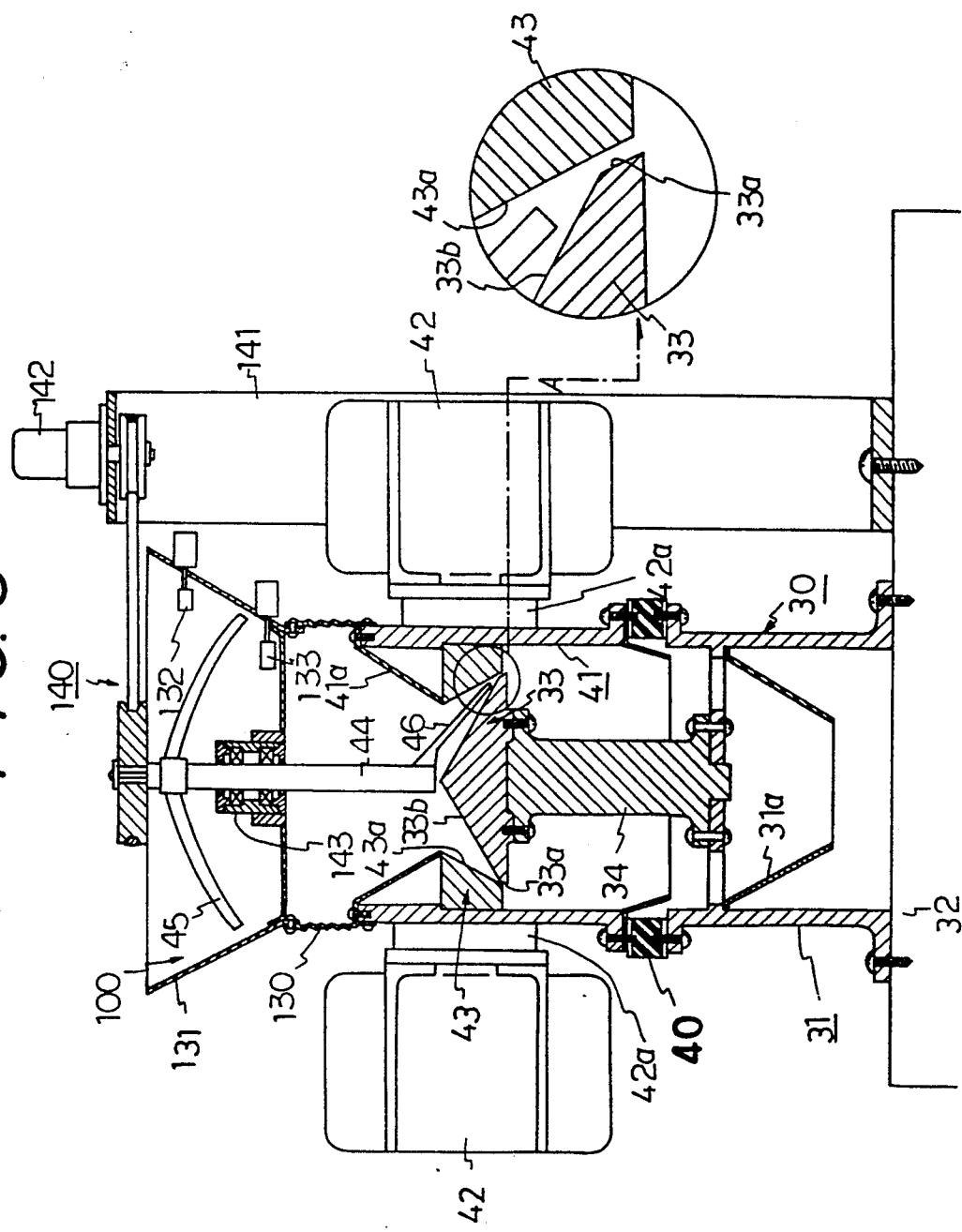
FIG. 8 is a longitudinally sectioned view that provides a schematic representation of the general aspect of the third apparatus embodiment for pulverizing and granulating or pulverizing, separating and granulating the material to be treated according to the invention, in which a stirring mechanism is added to the second arrangement embodiment and a portion shown at A is partly enlarged.

FIGS. 6 and 7 as well as FIG. 8 are longitudinally sectioned and cross-sectional views showing parts of apparatus embodiments wherein, according to the second and third process embodiments mentioned above, directional compression impacts are continuously applied to the small pieces 12 obtained by crushing the molded resin article 11, whereby the resin film 14 is released from the surfaces of those small pieces 12 and, hence, the surface of the resin material 13 or, more specifically, illustrate schematically the general structures of the compression impact applicators of the second apparatus embodiment (FIG. 6) used for pulverizing or granulating or pulverizing or separating and granulating the material 17 to be treated (as will be described later) and the third apparatus embodiment (FIG. 8) in which the second apparatus is additionally provided with a stirring mechanism. It is noted that in FIGS. 6 and 8, the zones A are shown on an enlarged scale.

When the second or third process embodiment is practically used, the second or third compression impact applicator 30 (FIGS. 6-8) is used for releasing, separating and removing the resin film 14 from the resin material 13. As illustrated, each apparatus embodiment includes compression impact-applying members 33 and 43 for applying compression impacts to the small pieces 12 obtained by crushing the molded resin article 11. To this end, either one of the compression impact-applying members 33 and 34 or, in the instant embodiment, the outer member 43 is used in cooperative association with the other or the inner member 33, thereby achieving a continuous application of the compression impacts on the small pieces 12 with some directionality or, in the instant embodiment, in the circumferential and, optionally, in the downward direction.

As can be seen from FIGS. 6, 7 and 8, the second compression impact applicator 30 includes a base 31 in a substantially cylindrical form, which is fixed on a support surface 32 and a cylindrical, upper vibrator part 41 which surmounts base 31 through a vibration-damping elastic member 40 and which is in concentric and cooperative association therewith. It is understood that the elastic member 40 has a coefficient of elasticity sufficient to damp and absorb fine vibrations continuously applied to the upper vibrator part 41, as will be described later.

An upper surface 33b of inner compression impact-applying member 33 is of an umbrella shape in section, which is spread open at given angles or, in the instant embodiment, at angles sufficient to receive the small pieces 12, and said inner compression impact-applying member 33 has on its outer periphery a compression impact-applying surface 33a that is in an outward, conical or truncated-conical form. The inner compression impact-applying member 33 is firmly fixed at the upper end of a support post 34 that is fixed on the central region of base 31 and projects upwardly therefrom in concentric relation to part 41. It is noted that reference numeral 31a indicates a hopper that is concentrically located within base 31.

The upper vibrator part 41 is fixedly provided with vibration generator means on its sides through brackets 42a at given angular intervals and in a well-balanced state or, in the instant embodiment, a set of a pair of vibration-generating motors 42 and 42, for instance, the so-called vibration motors with an eccentric weight on each, Further, an outer compression impact-applying member 43 is firmly fixed on the inner sides of the upper vibrator part 41, said member 43 being provided with a compression impact-applying surface that is opposite to and parallel or substantially parallel with or upwardly spaced away from the inner compression impact-applying surface 33a and is in an inward conical or truncated-conical form. Between the inner and outer compression impact-applying surfaces 33a and 33b, there is a gap sufficient to receive the small pieces 12 and to apply a compression impact to them as desired. The regulation of this gap may be easily achieved by vertically displacing one of the inner and outer compression impact-applying members 33 and 43 with respect to the other, although not illustrated. This is because the compression impact-applying surfaces 33a and 43a, each in a conical or truncated-conical form, are located in opposition to each other. In other words, it is possible to regulate the gap between the inner and outer compression impact-applying surfaces 33a and 43a by varying the thickness of the elastomer 40 (70) or alternatively inserting a spacer having a desired thickness between them. It is noted that the inner compression impact-applying member 33 may be provided on its upper surface 33b with a plurality of guide projections for guiding the introduction of the small pieces 12, although not illustrated. No critical limitation is imposed on what forms they take or where they are located; for instance, a cubic, conical, triangular-pyramidal or other form of projection may be located at equiangular intervals. It is noted that reference numerals 41a and 41b stand for feeding and intermediate hoppers that are located in an upper opening and an inside lower region of the upper vibrator part 41, respectively.

According to the second illustrative process embodiment mentioned above, a pair of vibration-generating motors 42 and 42 provided on the upper vibrator part 41 of the second compression impact applicator 30 is driven, so that fine vibrations can occur continuously between the outer compression impact-applying member 43 of the upper vibrator part 41, i.e. the outer compression impact-applying surface 43a and the inner compression impact-applying surface 33a with some directionality, say, in a rotating circular direction or, more preferably, a downward, rotating circular direction.

As the individual small pieces 12 to be treated are fed onto the upper surface 33b of the inner compression impact member 33 through its upper opening, they are introduced seriatim between the inner and outer compression impact-applying surfaces 33a and 43a, between which they are rolled or slid with some resistance, so that compression impacts based on the above-mentioned directional fine vibrations can be continuously applied to them. Here, the small pieces 12 are subject to squeezing and elongating actions including a sliding action corresponding to that directionality and, with these actions, the variations of internal stress mentioned above are applied to the resin material 13 and resin film 14 forming each small piece 12 more efficiently and effectively when compared with the first compression impact applicator 20 already mentioned. This results in easy releasing and separation of the resin film 14 from the resin material 13 to be recovered, followed by the two being discharged downward. In this manner, the resin film 14 is separated from the resin material to be recovered, as desired.

In connection with the construction of the second compression impact applicator 30, it is understood that if the inner and outer compression impact-applying surfaces 33a and 43a are upwardly spaced away from each other, then the introduction of each small piece 12 between the inner and outer compression impact-applying surfaces 33a and 53a and 43a and 73a could be more smoothly achieved, and clogging of the pieces 12 between those surfaces that otherwise may occur while subjected to the squeezing and elongating actions incidental to the rolling and sliding with some resistance could be effectively avoided as well. It is also understood that similar or substantially similar effects could be obtained, even when the inner and outer compression impact-applying surfaces 33a and 43a are in a combined arched or conical form, or alternatively in a combined truncated-conical/arched form. Another effective means for applying compression impacts to the small pieces 12 to be treated is a fluid for promoting the peeling of the resin film 14 to be removed, for instance, water is downwardly passed between the inner and outer compression impact-applying surfaces 33a and 43a.

It is further understood that while the invention has been explained with reference to the embodiments using a pair of vibration-generating motors 42 and 42, reductions in the amounts of vibrations transmitted to the outside and operating noises may be achieved by making use of two pairs of vibration-generating motors, four in all, at equiangular intervals of 90°.

FIG. 8

Reference will now be made to the construction of the apparatus embodiment shown in FIG. 8, but it is noted that explanations of the parts common to those in the apparatus embodiment shown in FIG. 6 are omitted. The apparatus embodiment applied to releasing the resin film to be removed from the resin material to be recovered for separation and removal, both forming the material 100 to be treated, (note that the instant embodiment may be applied not only to peeling the resin film off the material 100 but pulverizing or granulating the material 100 as well, as will be described later) includes a feeding opening 131 that is fitted onto the upper vibrator part 41 mentioned above through a vibration-shielding, flexible member 130 for supplying a feed of the material 100 to be treated and a stirring/feeding mechanism 140 that is positioned at an upper zone including the interiors of said feeding opening and upper vibrator part 41 and located in concentric and cooperative association with the lower base 31 to prevent or allow the solidification of the material 100 supplied due to its agglomeration and tightening.

The vibration-shielding, flexible member 130 mentioned above has a flexibility or toughness sufficient to provide a shielding of the fine vibrations of the upper vibrator part 41.

As already stated, the feeding opening 131 mentioned above is positioned at the upper end of the upper vibrator part 41 through the flexible member 130 or, in the instant embodiment, a flexible member 130 of rubber vulcanized in a bellows form, and allows the material 100 to be treated to be received from above. Additionally, it includes upper and lower limit sensors 132 and 133 for detecting the upper and lower limits of the material 100 fed, respectively.

The stirring/feeding mechanism 140 mentioned above includes a stirring shaft 44 that is rotationally driven, while reduced in speed, by means of, for instance, a geared motor 142 with a speed reduction mechanism (not shown) fixedly placed on a framework 141, optionally through a pulley, a belt and the like, and is rotationally supported by a bearing portion 143. This stirring shaft depends from the top of the apparatus and extends down through the feeding opening 131 and upper vibrator part 41, and is provided with a hopper stirring blade 45 that extends laterally through the feeding opening 131, correspondingly, and an inlet stirring blade 46 that is located close to an inlet zone between the compression impact-applying surfaces 33a and 43a mentioned above.

It is understood that while the embodiment mentioned just above has been described as including both the hopper stirring blade 45 and the inlet stirring blade 46, use may be made of the inlet stirring blade 46 alone, although this is depending on the amount, type and properties of the material to be treated. In addition, the blade configuration is not limited to that shown, and two or three blades may be located at equidistant intervals or four blades may be used in a cruciform.

According to the apparatus embodiment of the construction mentioned above, the stirring/feeding mechanism 140 is driven, thereby enabling its hopper and inlet stirring blades 45 and 46 to be driven while reduced in speed, and a pair of vibration-generating motors 42 and 42 provided on the upper vibrator part 41 of the compression impact-applying and granulating mechanism is rotationally driven, thereby enabling fine vibrations to occur on the outer compression impact-applying member 43 of the upper vibrator part 41, more specifically, between the outer compression impact-applying surface 43a and the inner compression impact-applying surface 33a of the inner compression impact-applying member 33 in a rotating circular direction and, more preferably, in a somewhat downward, rotating circular direction. As a matter of course, it is understood that the conditions for the directional fine vibrations mentioned above should be controlled depending on the properties and nature of the material 100 to be treated.

Then, the material 100 to be treated is fed onto the upper surface 33b of the inner compression impact-applying member 33 through the upper opening of the feeding inlet 131. Even when it is fed in a large amount and so forms a material stack, its solidification due to agglomeration and tightening is prevented, because it is subjected to the stirring action of the hopper stirring blade 45. Even in the inlet zone between the inner and outer compression impact-applying surfaces 33a and 43a, that material is fed seriatim and smoothly in a gradually narrowing path defined thereby, because it is now subjected to the stirring action of the inlet stirring blade 46. Between the compression impact-applying surfaces 33a and 43a, compression impacts based on given directional fine vibrations are continuously applied to the material, while it is rolled or slid with some resistance. Here, the material 100 is subject to squeezing and elongating actions including a sliding action corresponding to that directionality and, with these actions, the variations of internal stress mentioned above are applied to the resin material to be recovered and the resin film to be removed forming the material 100. This results in easy releasing and separation of the resin film to be removed from the resin material to be recovered, followed by the two being discharged downward.

In connection with the arrangement embodiment mentioned above, it is understood that although directional fine vibrations generated through the compression impact-applying and granulating mechanism have been described as being applied to the outer compression impact-applying member 43, such fine vibrations may also be applied to the inner compression impact-applying member 33 by relying upon nearly similar technical means or, as needed, both the inner and outer compression impact-applying members 33 and 43 may be finely vibrated with each other.

Although not illustrated, for example, this may be achieved by fixing vibration motors with an eccentric weight on each, like the above-mentioned pair of vibration-generating motors 42 and 42, on given equiangular positions of the outer surface of the lower base 31 mentioned above, while they are located in a well-balanced state. Alternatively, fine vibrations with rotational movement may be obtained on the inner compression impact-applying member 33 by rotationally supporting the inner compression impact-applying member 33 of the lower base 31, connecting this shaft with a geared motor located on the outside of the lower base as through a bevel gear, and allowing an eccentric weight portion to extend from the inner compression impact-applying member 33 or this rotational shaft.

Figure 4:
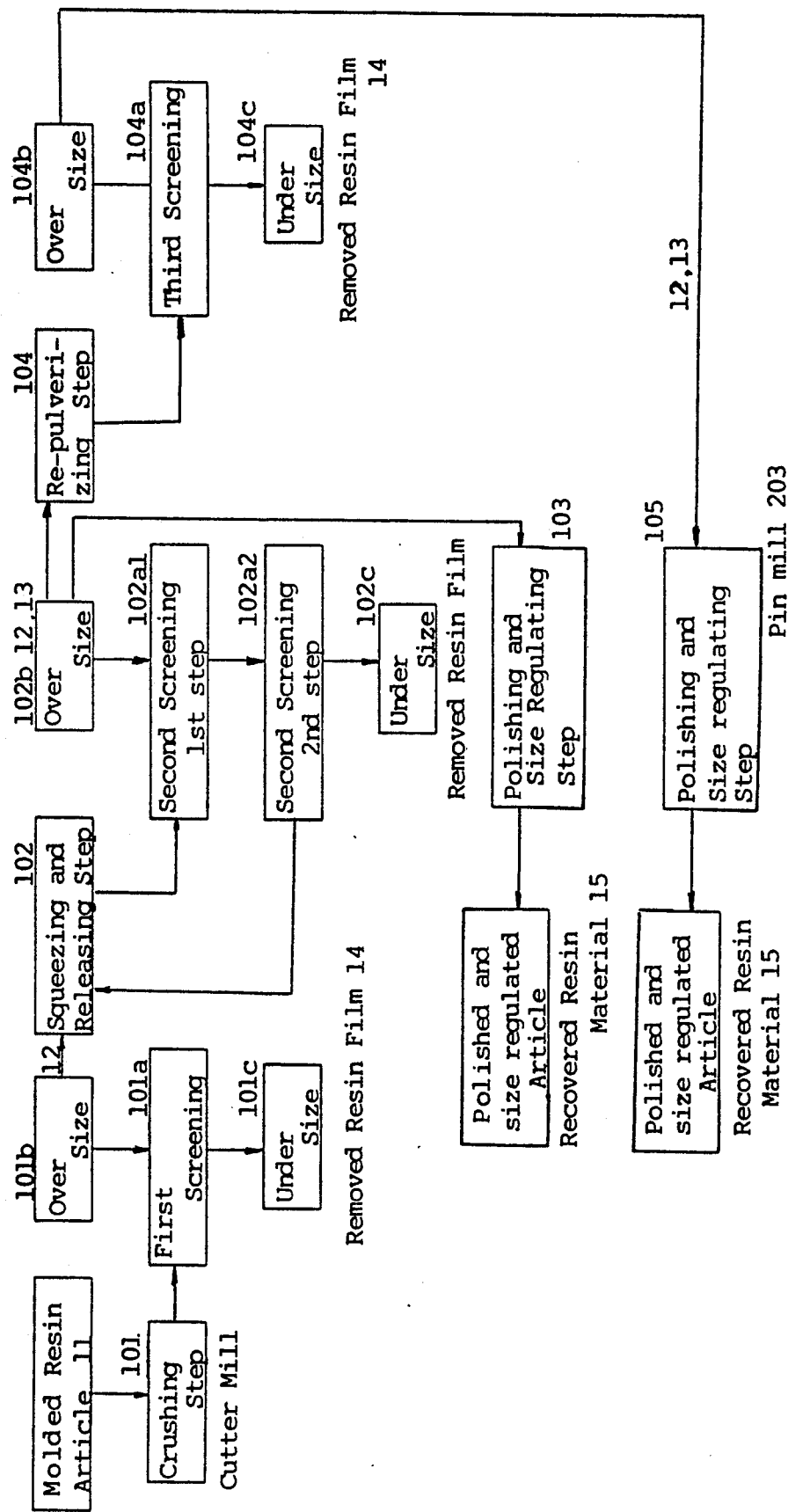
FIG. 4 is a process chart of the treating steps, which provides a principal and schematic representation of the general aspect of the illustrative, second embodiment of the process for pulverizing and separating a resin material that is an example of the material to be treated by the invention and the process for pulverizing, separating and size-regulating that resin material.
Figure 5:
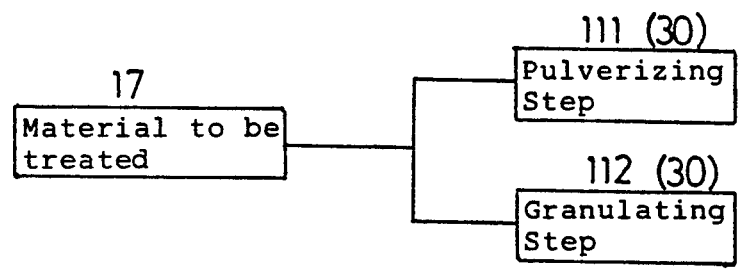
FIG. 5 is a process chart of the treating steps, which provides a principal and schematic representation of the general aspect of the process of pulverizing, separating and granulating a powder material according the third embodiment of the invention.

FIGS. 4 and 5 repesent principally and schematically the general aspects of the steps of the illustrative, second and third process embodiments for pulverizing and separating resin material and pulverizing, separating and size-regulating resin material, respectively.

FIG. 4

According to the second and third process embodiments, the first, second and third compression impact applicators 20 and 30 are used to release and separate resin film 14 to remove it from the resin material 13 to be recovered, both forming the small pieces 12 to be treated. It is here noted that these process embodiments provide means as to what is to be done when the resin film 14 is relatively firmly deposited on the resin material 13 and so some small pieces are discharged while the resin film 14 remains deposited onto the resin material 13; in other words, they provide means for re-pulverizing the small piece 12 with the resin film 14 remaining deposited onto the resin material 13 and then subjecting the resulting powder to polishing and size regulation.

According to these process embodiments, as can be seen from what has been described and FIG. 4 as well, the molded resin article 11 is first subjected to primary crushing at a primary crushing step 101 as by a cutter mill 201 until all the crushed particles pass through a given mesh screen provided with pores having a predetermined diameter by means of punching. After that, the crushed particles are subjected to a first sieving 101a, whereby small pieces 12 are left on the oversize side 101b, while a small amount of the resin film 14 released during the primary crushing is removed on the undersize side 101c.

Then, the small pieces 12 left on the sieve are squeezed and peeled off at a squeezing/peeling step 102 with the first or third applicator 20 or 30, and then subjected to a second sieving or, in the instant embodiments, a two-stage sieving, say, a first sieving $102a_1$ and a second sieving $102a_2$.

More specifically, the resin material 13 to be recovered is subjected to sufficient squeezing and accelerated peeling at the first sieving stage $102a_1$ and made so flat and increased in size that it is left behind on the oversize side 102b. When there is no need of size-regulating such a material 13 of large size, it is passed into a polishing/size-regulating step 103, where it is polished and size-regulated with a polishing/size-regulating unit 150 (FIG. 11) that will be explained later at great length, whereby the corners or edges of the resin material 13 that are made up of polished and size-regulated particles are so rounded that it can be recovered as a resin material 15 consisting of size-regulated particles.

At the second sieving stage $102a_2$, on the other hand, there are left behind small pieces 12 of smaller size that have not been subjected to sufficient squeezing and so have undergone limited peeling. Such small pieces 12 of smaller size are fed back to the squeezing/peeling step 102, where they are again squeezed. On the undersize side 102c, the resin film 14 or the like is peeled off and removed by such repeated squeezing.

Turning again to the resin material 13 of larger size that have been left behind on the oversize 102b side, when there is need of regulating it in terms of size, it is subsequently re-pulverized at the next re-pulverizing step 104 as by a disc mill 202, whence it is passed into a third sieving step 104a, so that the thus re-pulverized small pieces 12 are left behind on the oversize 104b side, while the resin material 13 is separated off on the undersize 104c side. Note that at the time of re-pulverization, the resin film 14 is removed. Referring here to the small pieces 12 left behind on the oversize 104b side, they may be fed back to the re-pulverization step 104 until they reach an undersize level, or may alternatively be sieved over and over. The resin material 13 separated as mentioned above, on the other hand, is subsequently passed into the next polishing/size-regulating step 105, where it is polished and size-regulated as by a pin mill 203, so that it recovers a resin material 15 with the particle diameter lying in a given particle diameter range.

As will be apparent to those skilled in the art, the second process embodiment enables the steps to be variously combined with one another, as desired, and to be used in any desired combination depending on what purposes it is used for.

It is noted that a preferable example of the construction of the polishing/size-regulating unit 150 mentioned above is illustrated in FIGS. 11 and 12.

FIG. 5

FIG. 5 represents a specific, third process embodiment for pulverizing the material to be treated, for instance, a relatively hard powder material obtained by crushing a molded powder article and/or size-regulating and granulating the material to be treated, for instance, a relatively soft powder material, in which the second and third compression impact applicators 30 are used as the pulverizer or the size-regulating/granulating unit. As can be best seen from FIG. 5, the material 17 to be treated is pulverized, as shown at 111, or granulated, as shown at 112, with the use of the compression impact applicator 30.

FIGS. 11 AND 12

Figure 11:
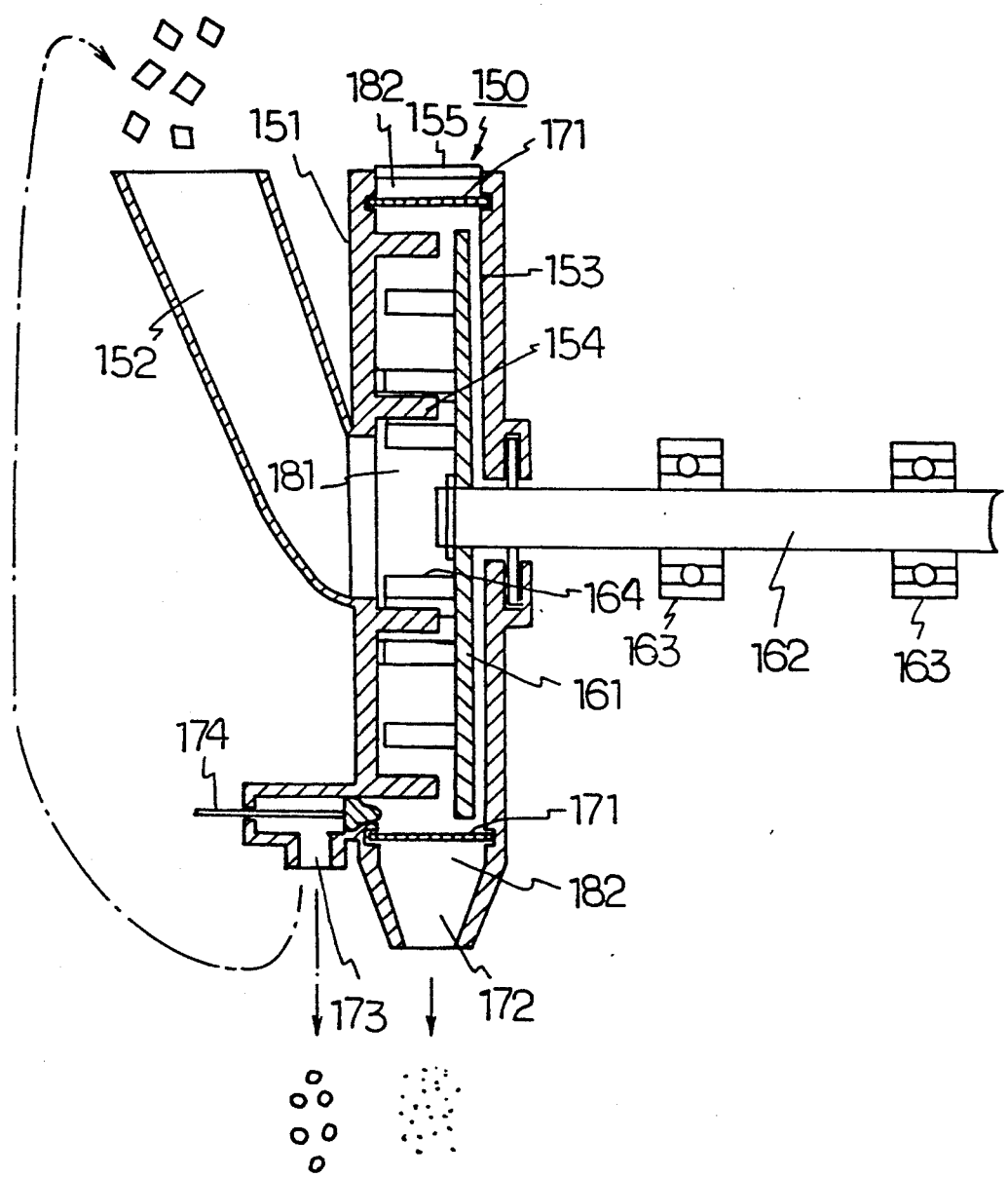
FIG. 11 is a longitudinally sectioned view that provides a schematic representation of the general aspect of the polishing and granulating arrangement as the fourth apparatus embodiment used in each of the second and third embodiments of the invention.

FIG. 11 is a longitudinally sectioned view that provides a schematic illustration of the general construction of one example of the polishing/granulating unit 150 used as the fourth apparatus embodiment for polishing and size-regulating the resin material 13 from which the resin film 14 has been removed, so that it can be recovered as the size-regulated resin material 15 with the corners being rounded as a whole. Likewise, FIG. 12 is a front view for illustrating the polishing and size-regulating actions of the above-mentioned unit 150.

Referring now to the construction of the apparatus shown in FIGS. 11 and 12, the polishing/size-regulating unit 150 includes a feeding inlet 152 for the material 17 to be treated, such as small pieces 12 obtained by crushing the molded resin article 11 or those obtained by crushing the molded powder article 16, a fixed disk member 151 that is open at a central region and communicates there with the feeding inlet 152, a fixed end plate member 153 joined to the fixed disc member 151 on the side of a side plate member 155 and a rotatable disc member 161 that is opposite to the fixed disc member 151 on the side of the fixed end plate member 153 and through a polishing/size-regulating space 181 and is rotationally rotated by a horizontally extending rotary shaft 162. Note that the rotary shaft 162 is rotationally supported by bearings 163 and 163.

The fixed disc member 151 is provided thereon with a plurality of concentric rings a of fixed pins 154 (FIG. 12) and the rotatable disc member 161 is provided thereon with a plurality of concentric rings b of movable pins 164 that lie in alternate relation to the fixed pins 154. Between these fixed and movable pins 154 and 164, the polishing and size-regulating actions are obtained. Further, between the outside of the rotatable disc member 161 and the side plate member 155, there is a screen 171 of given mesh that is provided with pores of a desired diameter by punching, which is spaced away from a discharge space 182. Below the discharge space 182 there is a discharge opening 172, and at a lower region of the interior of the polishing/size-regulating space 181 there is an outlet opening 173. Note that the outlet opening 173 is provided with a plug valve 174 that places it under opening/closing control.

According to the polishing/size-regulating unit 150 of the construction mentioned above, as the small pieces 12 or the material 17 to be treated are fed into the feeding inlet 152, they are subjected to both the polishing/size-regulating action and the centrifugal action at the central region of the polishing/size-regulating space 181 and between the fixed and movable pins 154 and 164. Then, they approach the outer periphery of the unit while being polished and size-regulated, and the resultant polished and size-regulated powders pass through the screen 171 into the discharge space 182, from whence such powders are discharged through the discharge opening 172 to the outside. The size-regulated resin material 15 with the corners being generally rounded or the size-regulated powder material is removed through the outlet opening 174 by opening the plug valve 173.

When the outlet opening 173 communicates with the feeding inlet 152 while the plug valve 174 remains open, the size-regulated resin material 15 removed through the outlet opening 173 or the size-regulated powder material may be fed back to the feeding inlet 152, thus making continuous polishing and size-regulation feasible.

The second and third compression impact applicators 30 mentioned above have been explained as applied to releasing and separating the resin film 14 from the resin material 13, both forming the small pieces 12 to be treated. It is noted, however, that such applicators 30 have application not only in the releasing and separation of the resin film 14 from the resin material 13 but also in the pulverization of the relatively hard material to be treated and/or the size-regulation or granulation of the relatively soft material to be treated, for instance, the material obtained by the pulverization of spice such as peppers as well as pulses, e.g., coffee bean, green tea and wood chips, although not illustrated. In other words, they may be easily applicable as a pulverizer, a size regulator or a granulator by controlling and presetting their operating conditions depending on how the material is treated as well as on its properties and nature, especially by regulating the directional fine vibrations in association with the preset gap between the inner and outer compression impact-applying members.

When the above-mentioned applicator is used as the pulverizer for treating a material such as a relatively hard powder material, it is required to preset the conditions for the directional fine vibrations such that their amplitudes are reduced while their intensities are increased in view of the properties of that material that it is, on the one hand, relatively soft but, on the other hand, low in viscosity and fragile. With this pulverizer operated as in the manner mentioned above, the material fed into it is pulverized by a certain type of vigorous and continuous beating action resulting from the vibrations that are slight in amplitude but strong in intensity. Consequently, this material can be pulverized efficiently, effectively, satisfactorily and easily.

When the above-mentioned applicator is used as the size-regulating/granulating unit for treating a material such as a relatively soft powder material, by contrast, it is required to preset the conditions for the directional fine vibrations such that their amplitudes are increased while their intensities are somewhat reduced in view of the properties of that material that it is, on the one hand, relatively soft but, on the other hand, high in viscosity and nerve. With this unit operated as in the manner mentioned above, the material fed into it is effectively subjected to the rolling and kneading actions resulting from the fine vibrations that are applied between the inner and outer compression impact-applying surfaces and are increased in amplitude and somewhat reduced in intensity, whereby it is size-regulated or granulated within the required particle diameter range, or alternatively whereby the powders of the material are entangled with one another, so that they can be size-regulated or granulated within the required particle diameter range. Consequently, granulation can again occur efficiently, effectively, satisfactorily and easily.

Figure 9:
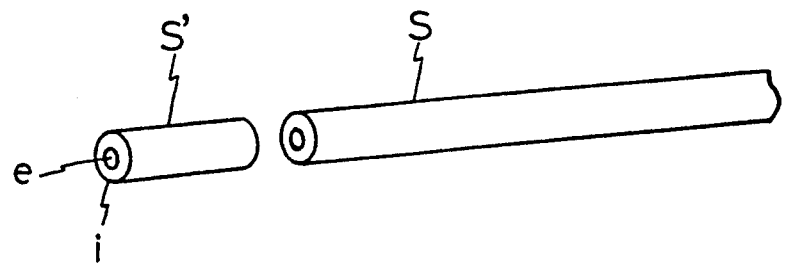
FIG. 9 is a perspective view of one example of a wire material S made up of a conductor and an insulator.
Figure 10:
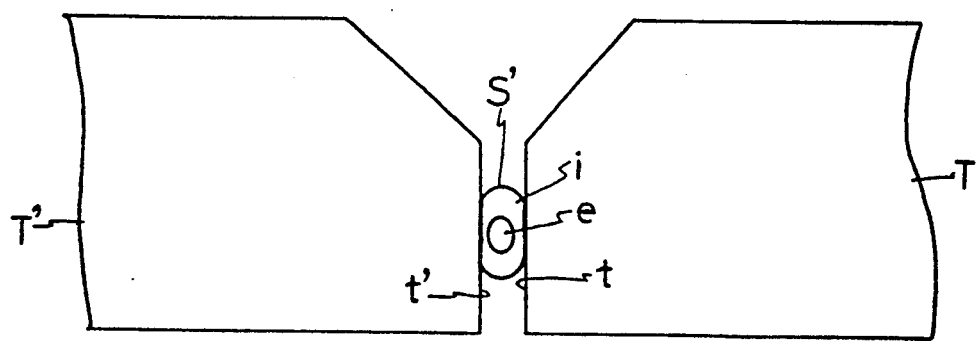
FIG. 10 is a diagrammatic view showing one means for applying compression impacts to the wire mentioned above.

FIGS. 9 and 10

FIG. 9 represents a wire material S in which a conductor e is covered with an insulator i, such as an insulated electrical wire or cord, and a cut wire piece S', and FIG. 10 illustrates one typical means for applying to this cut wire piece S' fine vibration-induced compression impacts.

The wire material S to be treated here may be an insulated electrical wire or cord or, may generally be made by covering the conductor e with the insulator i. For instance, it may be a single- or double-core cord in which a stranded conductor of copper is covered as with polyethylene, vinyl chloride resin or synthetic rubber such as styrene-butadiene type rubber or an insulated electrical wire in which a copper or aluminum wire is covered as with polyethylene, crosslinked polyethylene, polyvinyl chloride or synthetic rubber. The cut wire piece S' that should have an easy-to-handle length may be obtained by cutting that wire material.

Fine vibration-induced compression impacts are applied to such a cut wire piece S'.

The conductor e of the cut wire piece S' is squeezed by such fine vibration-induced compression impacts, so that it can be driven in a scaly form out of the insulator i due to plastic deformation.

Driving this conductor e out of the insulator i may be achieved due to the elasticity of the insulator i composed mainly of synthetic resin or rubber, because the conductor 3 squeezed in a scaly form can pass through the insulator i.

One typical means for applying fine vibration-induced compression impacts to the cut wire piece S' is schematically illustrated in FIG. 10.

This compression impact-applying means includes a pair of compression impact-applying members T and T' having their compression impact-applying surfaces t and t' that are opposite to and spaced away from each other with a gap x into which the cut wire piece S' is fed. With the two members finely vibrated or one finely vibrated with respect to the other, the cut wire pieces S' fed into the gap are subjected to compression impacts while they are finely vibrated.

In this connection, it is noted that the compression impact-applying surfaces t and t' of the compression impact-applying members T and T' are not too much worn away, because they receive stress from the cut wire pieces S' and their powders obtained by pulverization.

Further, it is noted that since the fine vibration-induced compression impacts reduce the generation of heat on the impact-applying surfaces, not only is it possible to prevent the insulator i of the cut wire piece S' from being fused out during the impact treatment, but it is also possible to prevent the re-deposition of the insulator separated or released from to the scaly conductor e.

When the cut wire pieces S' are fed in this state between the inner and outer compression impact-applying surfaces 33a and 43a constituted by the inner and outer compression impact-applying members 33 and 43 of the construction shown in FIG. 6 or 8, they are sandwiched between the impact-applying portions 33a and 43a, inducing a certain resistance between the inner and outer compression impact-applying members 33 and 43. After that, the inner compression impact-applying surface 33a comes successively into circular engagement with the cut wire pieces S', so that they can receive compression impacts induced by fine vibrations occurring in a substantially horizontal direction with circular motion.

Upon the cut wire pieces S' receiving the compression impacts induced by fine vibrations occurring in a substantially horizontal direction with circular motion, they turn direction from time to time by such fine vibrations with circular motion, so that they can be pulled in a direction that allows them to be most easily squeezed and separated off with respect to the inner and outer compression impact-applying surfaces 33a and 43a, and they can turn direction from time to time within the inner and outer compression impact-applying surfaces 33a and 43a, thus ensuring that the conductors e are driven out of the insulators i in a scaly form.

Especially when the process mentioned above is performed dry, the conductors e are driven out of the cut wire pieces S' in a scaly form for separation from the insulators i. It is noted, however, that the conductors e are recovered in a flaky form, but the insulators i are left in the form of a relatively large lump.

A discrete mixture of the conductors e with the insulators i may be sorted out as with a vibration feeder.

For experimental purposes, a cord made up of a copper cable covered with vinyl chloride resin was cut to a length of 10 mm, and was then treated with a compression impact of 12.0 G in the above-mentioned apparatus including an inner compression impact-applying member of 100 mm in diameter. As a result, the covering material remained nearly intact and the copper cable portions were separated from the covering material in a flaky form.

Likewise, metals that are conductors including semiconductors will be capable of being separated and recovered from semiconductor chips for computers, word processors or the like and plastics that are insulators for other parts molded with plastics.

FIG. 13

Figure 13:
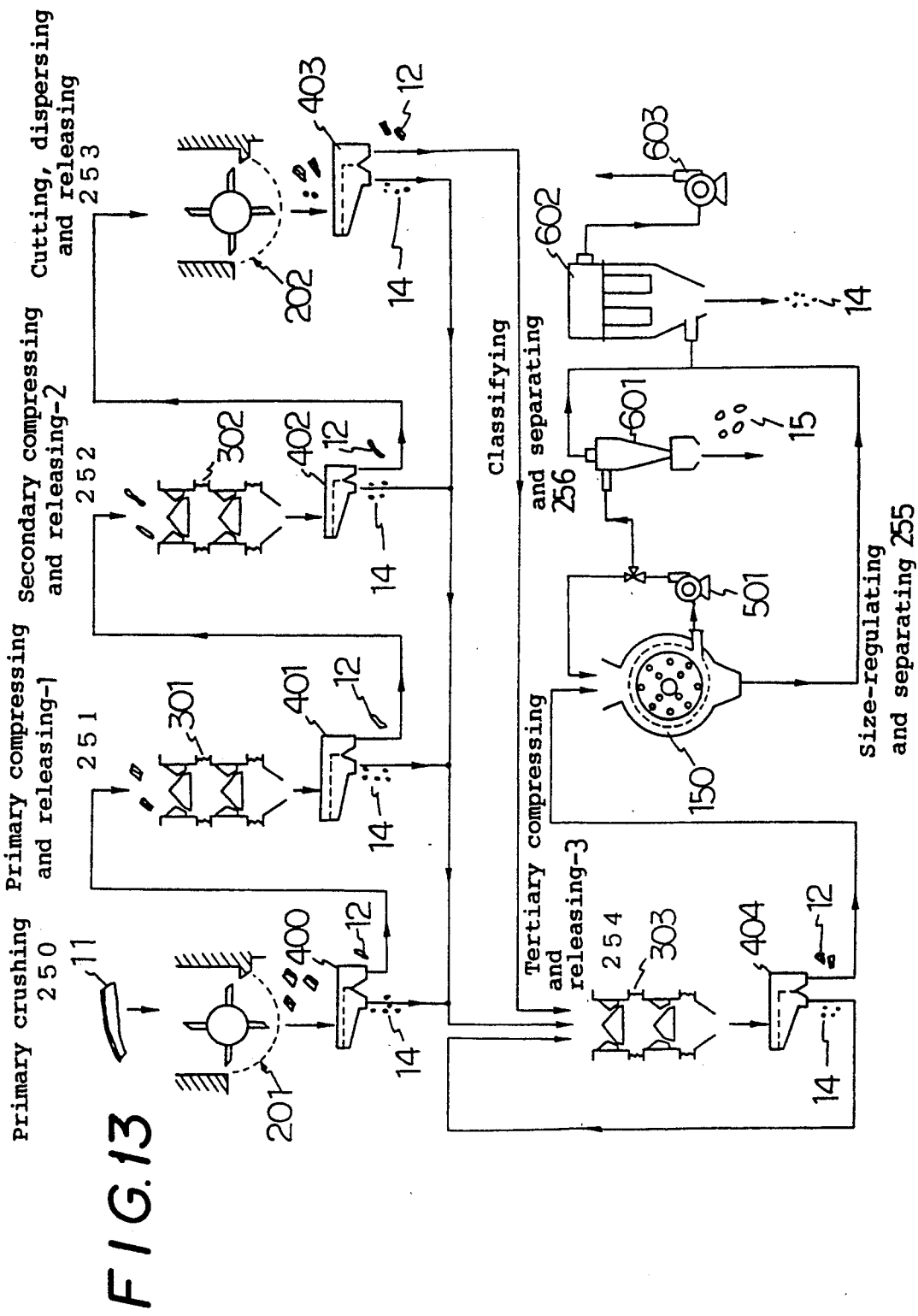
FIG. 13 is a process chart of the treating steps that provides a principal and schematic representation of the general aspect of the more practical, fourth embodiment of the process for pulverizing, separating and granulating a resin material according to the invention, when used practically.

Referring to FIG. 13 that shows a fourth process embodiment, it provides a principal and schematic process chart of the practical process for pulverizing, separating and granulating a resin material according to the invention.

The fourth process embodiment shown in FIG. 13 involves the following treating steps to be carried out.

(a) "Primary Crushing" Step 250

This "primary crushing" step 250 is provided to crush the molded resin article or a resin material in the form of a molded powder article for the purpose of obtaining small pieces 12. The "primary crushing" means used, for instance, may be such a cutter mill 201 as already mentioned or, in the instant embodiment, a cutter mill 201 having a screen provided with pores of about 4.0 m/m in diameter by means of punching.

At the "primary crushing" step 250 the molded resin article is primarily crushed by the cutter mill 201, producing some small pieces 12 of such a size that they do not pass through the screen having pores of a predetermined size or, in the instant embodiment, about 4.0 m/m in diameter, even when undergoing such primary crushing action. These small pieces are continuously and repeatedly subjected to the primary crushing until the given size is reached. Some small pieces 12 that have been primarily crushed at least to the predetermined size, on the other hand, pass through the screen.

Then, the small pieces 12 that have passed through the screen are sieved by a sieving unit 400 preset at a mesh size of about 1.0 m/m. This sieving enables some small pieces 12 that have not passed through the screen to be left behind on the unit for removal and the resin film 14 or the like that have passed through the screen to be discharged from below the unit.

(b) "Primary Compressing and Releasing-1" Step 251

This "primary compressing and releasing-1" step 251 is provided to subject the small pieces 12 obtained at the "primary crushing" step 250 mentioned above to the compressing and releasing treatment at the primary stage. For the compressing and releasing means at the first stage in the instant embodiment, for instance, use is made of the second or third compression impact applicator 30 modified such that it includes a compression impact applicator 301 built up of a pair of compression impact-applying units arranged vertically, each comprising the inner and outer compression impact-applying surfaces 33a and 43a with a clearance of about 2.0 m/m located between them by inserting a suitable damper therebetween, and a screening unit 401 having a mesh size preset at about 2.5 m/m for screening out the small pieces 12 elongated with a somewhat large size by receiving the compression and releasing actions applied by the applicators 301 mentioned just above.

At this "primary compressing and releasing-1" step 251, the small pieces 12 crushed to a predetermined size by the primary crushing treatment at the "primary crushing" step 250 are subjected seriatim to the primary compressing and releasing actions between the two sets of the inner and outer compression impact-applying surfaces 33a and 43a of the compression impact applicator 301, each with a clearance of about 2.0 m/m, so that they can be elongated with a somewhat large size by receiving the compression impacts applied. With this elongation, a large portion of the resin films 14 is released from the small pieces, and the thus treated pieces are screened out by the screening unit 401 having a mesh size preset at about 2.5 m/m, so that the small pieces 12 from which the resin films 14 have been released, although containing some small pieces with the resin films 14 still deposited on them, are left on the screen for removal, while the thus screened-out resin films 14, although containing some small pieces 12, are discharged from below the screen.

(c) "Secondary Compressing and Releasing-2" Step 252

This "secondary compressing and releasing-2" step 252 is provided to subject the small pieces of a somewhat large size to the compressing and releasing treatment at the secondary stage, said small pieces having been elongated with a somewhat large size by receiving the primary compressing and releasing treatment at the "primary compressing and releasing-1" step 251 and left on the screen unit 401. For the compressing and releasing means used at the secondary stage, use is made of a compression impact applicator 302 built up of a pair of compression impact-applying units arranged vertically, each comprising the inner and outer compression impact-applying surfaces 33a and 43a with a clearance of about 1.0 mm located between them by inserting a suitable damper therebetween, and a screening unit 402 having a mesh size preset at about 2.5 m/m for screening out the small pieces 12 elongated with a larger size by receiving the compression and releasing actions applied by the applicators 302 mentioned just above, as in the above-mentioned case.

At this "secondary compressing and releasing-2" step 252, the small pieces 12 elongated to a predetermined size by the primary treatment at the "primary compressing and releasing-1" step 251 are subjected seriatim to the secondary compressing and releasing actions between the two sets of the inner and outer compression impact-applying surfaces 33a and 43a of the compression impact applicator 301, each with a clearance of about 1.0 mm, so that they can be elongated with a larger size by again receiving the compression impacts applied. With this elongation, some of the remaining resin films 14 are released, and the thus treated pieces are screened out by the screening unit 402 having a mesh size preset at about 2.5 mm, so that the small pieces 12 from which the resin films 14 have been released, although containing some small pieces with the resin films 14 still deposited on them, are left on the screen for removal, while the thus screened-out resin films 14, although containing some small pieces 12, are discharged from below the screen.

(d) "Cutting, Dispersing and Releasing" Step 253

This "cutting, dispersing and releasing" step 253 is provided to cut, disperse and release the small pieces 12 elongated to a larger size by receiving the secondary compressing and releasing treatment at the "secondary compressing and releasing-2" step 252 and left on the screen unit 402 with a larger size in view of the requirements for the subsequent treatment, for instance, the need of regulating the particle diameter of the resin material 15 to be finally recovered to within a predetermined particle diameter range or, in the instant embodiment, cut, disperse and release such small pieces as the re-primary crushing treatment. For the cutting, dispersing and releasing means used, use is made of a cutter mill 202 provided with a screen having pores of about 6.0 m/m in diameter that are formed by punching and a screening unit 403 having a mesh size preset at about 1.0 m/m for screening out the small pieces 12 that have been cut and dispersed with the required size by receiving the cutting, dispersing and releasing actions of the cutter mill 202.

At this "cutting, dispersing and releasing" step 253, the small pieces 12 elongated to a predetermined size by the secondary treatment at the "secondary compressing and releasing-2" step 252 receives the cutting, dispersing and releasing actions by the cutter mill 202, so that they are again cut to a predetermined size, while some small pieces still contain the resin films 14 to be removed. With this re-cutting, some of the remaining resin films 14 are released, and there are left in the screen small pieces which have not passed through the screen having a given mesh size or, in the instant embodiment, about 6.0 mm even upon receiving the primary crushing action. Such small pieces 12 are repeatedly and continuously cut and dispersed until they reach a predetermined size. On the other hand, the small pieces 12 are obtained by being cut to at least a predetermined size and so passing through the screen.

The small pieces 12 that have passed through the screen are again screened out through the screening unit 403 having a mesh size preset at about 1.0 mm. As a result of this screening, the small pieces 12, some of which remain deposited on them with the resin films 14, are left on the screen, while the resin films 14, some of which are associated with the small pieces 12, are discharged from the screen.

It is noted that this "cutting, dispersing and releasing" step may be dispensed with, if there is no need of regulating the particle diameters of the recovered resin material 15.

(e) "Tertiary Compressing and Releasing-3" Step 254

This "tertiary compressing and releasing-3" step 254 is provided to subject the small pieces 12 again cut and dispersed with the required size by receiving the cutting, separating and releasing treatments at the "cutting, dispersing and releasing" step 253 and left on the screen to the compressing and releasing treatments at the tertiary stage. For the compressing and releasing means used at this tertiary stage, use is made of a compression impact applicator 303 built up of a pair of compression impact-applying units arranged vertically, each comprising the inner and outer compression impact-applying surfaces 33a and 43a with a clearance of about 0.8 mm located between them by inserting a suitable damper therebetween, and a screening unit 404 having a mesh size preset at about 2.5 mm for screening out the small pieces 12 elongated with a larger size by receiving the compressing and releasing actions applied by the applicator 302 mentioned just above, as in the above-mentioned case.

At this "tertiary compressing and releasing-3" step 254, the resin films 14, some of which are still associated with the small pieces 12 and which are discharged from the treating steps 250 to 253 are subjected seriatim to the tertiary (final) compressing and releasing actions between the two sets of the inner and outer compression impact-applying surfaces 33a and 43a of the compression impact applicator 303, each with a clearance of about 0.8 mm, in association with the small pieces 12 of a somewhat large size cut, dispersed and released at the treating steps 250 to 253, so that they can be elongated with an even larger size by still again receiving the compression impacts applied. With this elongation, some of the remaining resin films 14 are released, and the thus treated pieces are screened out by the screening unit 404 having a mesh size preset at about 2.5 m/m, so that the small pieces 12 from which the resin films 14 have been released, although containing some small pieces with the resin films 14 still deposited on them, are left on the screen for removal, while the thus screened-out resin films 14, although containing some small pieces 12, are discharged from below the screen. The resin films 14 discharged, some of which still contain the small pieces 12, are fed back as well to the compression impact applicator 301 associated with it.

When screening out the resin films 14, some of which still contain the small pieces 12 and which are discharged from the steps 250 to 254 mentioned above, it is possible to reduce as much as possible the amount of the small pieces 12 contained in the resin films 14 removed from below the screen by regulating the mesh size of each of the screening units 400 to 404 to 1 mm. When the screening units 400 to 404 with a mesh size of 1 mm each are used at the treating steps 250 to 254, it is preferable to remove and separate the resin films 14, some of which still contain the small pieces 12 and which are discharged from below the screening units 400 to 404, without being subjected to the re-compressing and releasing treatments at the "tertiary compressing and releasing-3" step 254.

(f) "Size-Regulating and Separating" Step 255

This "size-regulating and separating" step 255 is provided to size-regulate the small pieces 12 elongated with a somewhat large size by receiving the tertiary (final) compressing and regulating treatments at the "tertiary compressing and releasing-3" step 254 and left with a larger size on the screen by screening or, in other words, the resin material 13 to be recovered to obtain the size-regulated resin material 15 at the final stage. For the size-regulating and separating means used at this final stage, use is made of the polishing and size-regulating unit 150 already mentioned or, in the instant embodiment, a polishing and size-regulating unit 150 having a screen provided in it with pores of about 1.0 mm in diameter by punching and a blower 501 for sucking the size-regulated resin material 15 as product left in the screen for removal.

It is noted that in place of, or in combination with, the blower 501 mentioned above, compressed air may be supplied in a polishing and size-regulating space 181 (FIG. 11) in the polishing and size-regulating unit 150 mentioned above to stir the resin material 13 to be recovered and the resin material 13 may be fed back to the inlet opening communicating with a hole formed through the fixed end plate 153 by way of a pipe.

At this "size-regulating and separating" step 255, the resin material 13 to be recovered in the form of the small pieces 12 elongated to a predetermined size by the secondary (final) treatment at the "tertiary compressing and releasing-3" step 254 is subjected to the size-regulating and separating actions by the polishing and size-regulating unit 150, so that the size-regulated resin material 15 of such a size that it does not pass through the screen having a pore size preset at about 1.0 m/m is left as product. The size-regulated resin material 15 is sucked through the blower 501 for removal, and the resin films 14 including scrap and reduced to a given size or less, which are treated just like dust, are sucked as well by the blower 603 for discharge.

(e) "Classifying and Separating" Step 256

This "classifying and separating" step 256 is provided to classify the size-regulated resin material 15 that has been size-regulated and separated at the "size-regulating and separating" step 255 as product and sucked through the blower 501 for removal and the resin films 14, etc., some of which still contain dust and scrap. Used for the classifying and separating means, for instance, are a known cyclone unit 601 in the case of the classification of the former and a known back filter unit 602 in the case of the classification of the latter as well as a blower 603 needed for suction through the back filter unit 602.

At this "classifying and separating" step 256, the resin material 15 contains dust and scrap, albeit partly, that has been size-regulated and separated at the "size-regulating and separating" step 255; this material is classified by the cyclone unit 601, and is then collected as product for recovery, as desired. Dust, scrap and the like separated by the cyclone 601 are combined with the resin films 14, some of which contain dust, scrap and the like, and then separated by the back filter unit 602 under the suction by the blower 603 for collection.

The thus obtained resin material 15 may immediately be used for resin molding. It is noted, however, that the resin material obtained here is not completely cleared of the resin films 14. When the resin material 15 contains the resin films 14 in a relatively low proportion, it may be applied as a resin material used for resin molding with no difficulty, if it is pulverized to a fine particle size, for instance, under 100 μm.

Further, it is noted that the resin films 14, etc., collected by the back filter unit 602 may also be used as resin material, if they are pulverized to a fine particle size, for instance, under 100 μm. The resin films, if finely pulverized, may also be used as a resin material for resin molding with no difficulty.

It is also noted that in the fourth process embodiment various combinations of the treating steps may be feasible; that is, any desired combinations of the treating steps may be applied depending on what purposes that process embodiment is used for.

In other words, the fourth process embodiment may be modified to a fifth process embodiment that will now be explained with reference to FIG. 13. According to this embodiment, a soft material is treated at the "primary crushing" step 250 with the exception that the screening treatment with the screening unit 400 is omitted; then at the "tertiary compressing and releasing-3" step 254, provided that a single-compressing and releasing treatment is done with a single-stage compression impact-applying unit of the construction shown in FIG. 8, rather than with a pair of compression impact applicators arranged vertically, followed by screening with the screening unit 400; and finally at the "size-regulating and separating" step 255 provided that the polishing and size-regulating treatments are done with the pin mill of the polishing and size-regulating unit 150, whereby it is possible to recover the (size-regulated) resin material 15 that is usable for resin molding.

This embodiment gives a recovery rate of 45% and a residual resin film amount of 0.49% by weight.

Further, in a sixth process embodiment that is provided for treating a hard material and is largely different from the process shown in FIG. 13, use is made of a compression impact applicator of a large size that has a throughput capacity (30 to 50 kg/hr) about 3 to 8 times as large as that of the unit shown in FIG. 8 and a pin mill (having a throughput capacity of 30 to 50 kg/hr). Explaining this with reference to FIG. 13, (1) the "primary crushing" step 250 or, in this embodiment, the "cutter mill" step 201 is done, followed by (2) the "primary compressing and releasing-2" step or, in this embodiment, a single-stage compressing and releasing treatment, as in the fifth process embodiment mentioned above. Subsequently, (3) the "primary compressing and releasing-1" step or, in this embodiment, screening 401 (having a mesh size of 1.3 mm) is carried out, and (4) the "secondary compressing and releasing-2" step or, in this embodiment, a single-stage compressing and releasing treatment is again performed, immediately followed by (5) the "size-regulating and separating" step 255 or, in this embodiment, a polishing and size-regulating step using a 1.5-mm screen of the polishing and size-regulating unit 150. After that, (6) the single-stage compressing and releasing treatment is performed, followed by (7) treatment with the polishing and size-regulating unit 150 or, in this embodiment, re-polishing and size-regulating treatments using a pin mill having a 1.5-mm screen.

The recovery rate is 71 to 75% and the amount of residual resin films is 0.44 to 0.46% by weight.

By the screening treatment using the screening unit 401 at the above-mentioned step (3) or at the "primary compressing and releasing-1" step 251, 2 to 4% of resin films (or 5.8% by weight of (resin) film coatings) are obtained and rejected.

At the size-regulating and separation steps (5) and (7) 12 to 14% (about 3.0% by weight of film coatings) and 10 to 12% (about 2.7% by weight of film coatings) are separated, and a total of about 24% of film coatings can be used as a recycling material.

Through the final classifying and separating step, about 72 to 74% of the (size-regulated) resin material 15 including about 0.46% by weight of film coatings are recovered. It is noted that the above-mentioned resin material 15 containing 0.46 to 0.49% by weight of film coatings can be almost completely filtered out (to 0.15% by weight to 0.20% by weight) by making use of a known filter gauze for extruders (cf. U.S. Pat. No. 4,850,840 issued to Gneuss).

The following Table 1 shows the physical properties of the thus recovered polypropylene alone.

TABLE 1

| Recovered, Size-Regulated Resin Material | | | |
|---|---|---|---|
| | | | Grade |
| What was measured | | Units | Virgin | Recovered, Size-Regulated Resin Material |
| MI | | g/10 min. | 16.0 | 16.5 |
| Density | | g/cm$^3$ | 0.965 | 0.968 |
| HDT | | °C. | 110 | 109 |
| Tensile | Break Elongation | % | 102 | 84 |
| | Yield strength | kg/cm$^2$ | 191 | 187 |
| Flexural | Strength | kg/cm$^2$ | 261 | 253 |
| | Modulus | | 13,200 | 13,500 |
| IZOD | 23° C. | kgcm/cm | 66 | 59 |
| | −30° C. | | 6.5 | 6.2 |
| HRIT −30° C. | | J | 27.3 (Ductility) | 28.7 (Ductility) |
| Rockwell Hardness | | R scale | 49 | 46 |
| Gloss | | % | 42 | 45 |
| Appearance | | Visual | ⊙ | ○-△ |

The following Table 2 shows the blend physical properties of a mixture of 30% of the same size-regulated resin material as referred to in Table 1 and 70% of virgin.

TABLE 2

| Virgin/Recovered, Size-Regulated Resin Material = 70/30 Blend Physical Properties | | | |
|---|---|---|---|
| | | | Grade |
| What was measured | Units | Virgin | Blend |
| MI | g/10 min. | 16.0 | 17.0 |
| Density | g/cm$^3$ | 0.965 | 0.966 |

TABLE 2-continued

Virgin/Recovered, Size-Regulated Resin Material = 70/30 Blend Physical Properties

| What was measured | | Units | Grade Virgin | Blend |
|---|---|---|---|---|
| HDT | | °C. | 110 | 109 |
| Tensile | Break Elongation | % | 102 | 88 |
| | Yield strength | kg/cm² | 191 | 190 |
| Flexural | Strength | kg/cm² | 261 | 262 |
| | Modulus | | 13,200 | 13,900 |
| IZOD | 23° C. | kgcm/cm | 66 | 66 |
| | −30° C. | | 6.5 | 6.4 |
| HRIT −30° C. | | J | 27.3 (Ductility) | 27.1 (Ductility) |
| Rockwell Hardness | | R scale | 49 | 58 |
| Gloss | | % | 42 | 43 |
| Appearance | | Visual | ⊙ | o |

*Injection Molding after Dry Blending

Still further, according to a seventh process embodiment, (1) the "primary crushing" step 250 or, in this embodiment, the "cutter mill" step 201 is carried out, followed by (2) the "primary compressing and releasing-1" step or, in this embodiment, a single-stage compressing and releasing treatment with the unit of the construction shown in FIG. 8. This unit is the compression impact applicator 31 having inner and outer compression impact-applying surfaces 33a and 43a with a clearance of about 2.5 mm. Then, (3) the "secondary compressing and releasing-2" step or, in this embodiment, the compressing and releasing treatments again occur between the inner and outer compression impact-applying surfaces 33a and 43a with a clearance of about 2.0 mm, followed by (4) the "tertiary compressing and releasing-3" step or, in this embodiment, a single compressing and releasing treatment, for which use is made of a compression impact applicator 301 having inner and outer compression impact-applying surfaces 33a and 43a with a clearance of 2.0 mm.

At this stage, the (size-regulated) resin material 15 containing about 2.0% by weight of film coatings are obtained. This is immediately followed by (5) the "size-regulating and separating" step 255 or, in this embodiment, polishing and size-regulating steps making use of the polishing and size-regulating unit 150 having a 1.5-mm screen.

Upon completion of the above-mentioned steps, a recovery rate of about 84 to 86% is obtained with an amount of residual film coatings of 0.5% by weight.

The throughput is 80 to 100 kg/hr with the above-mentioned four inlet stirring blades rotating at 20 rpm.

This invention is clearly new and useful. Moreover, it was not obvious to those of ordinary skill in the art at the time it was made, in view of the prior art when considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A pulverizing and separating process for separating and removing a resin film from a molded resin article having a resin film on its surface, thereby recovering a raw form of resin material, comprising the steps of:
   first, crushing a molded resin article into a plurality of small pieces;
   next, squeezing said plurality of small pieces by applying thereto, by means of spaced apart compression impact-applying surfaces, compression impacts based on fine vibrations;
   supplying a separation-accelerating liquid between said spaced apart compression impact-applying surfaces.

2. A pulverizing and separating process for separating and removing a resin film from a molded resin article having a resin film on its surface, thereby recovering a raw form of resin material, comprising the steps of:
   first, crushing a molded resin article into a plurality of small pieces;
   next, squeezing said plurality of small pieces by applying thereto, by means of spaced apart compression impact-applying surfaces, compression impacts based on fine vibrations;
   removing from time to time resin film coatings released by said squeezing; and
   supplying a separation-accelerating liquid between said spaced apart compression impact-applying surfaces.

3. A pulverizing and separating process for separating and removing a resin film from a molded resin article having a resin film on its surface, thereby recovering a raw form of resin material, comprising the steps of:
   pulverizing a molded resin article into a plurality of small pieces;
   squeezing said plurality of small pieces by applying thereto, by means of spaced apart compression impact-applying surfaces, compression impacts based on fine vibrations, and removing from time to time resin film coatings released by said squeezing;
   re-pulverizing said squeezed small pieces;
   removing resin film coatings separated by said re-pulverization from the surface of said re-pulverized pieces; and
   supplying a separation-accelerating liquid between said spaced apart compression impact-applying surfaces.

4. A pulverizing and separating process that is applied to an insulated electrical wire or cord, or a material in which a conductor molded with plastics is covered with an insulator, comprising the steps of:
   first, crushing a wire material into a plurality of small wire pieces;
   next, squeezing said plurality of small pieces by applying thereto, by means of spaced apart compression impact-applying surfaces, fine vibration-induced compression impacts; and
   supplying a separation-accelerating liquid between said spaced apart compression impact-applying surfaces.

5. A pulverizing and separating process for separating and removing a resin film from a molded resin article having a resin film on its surface, thereby recovering a raw form of resin material, comprising the steps of:
   first, crushing a molded resin article into a plurality of small pieces;

next, squeezing said plurality of small pieces by applying thereto, by means of spaced apart compression impact-applying surfaces, compression impacts based on fine vibrations; and removing resin film coatings released by said squeezing when said small pieces are squeezed.

6. A pulverizing and separating process that is applied to an insulated electrical wire or cord, or a material in which a conductor molded with plastics is covered with an insulator, comprising the steps of:

first, crushing a wire material into a plurality of small wire pieces;

next, squeezing said plurality of small pieces by applying thereto, by means of spaced apart compression impact-applying surfaces, fine vibration-induced compression impacts; and removing resin film coatings released by said squeezing when said small pieces are squeezed.

7. A pulverizing and separating process for separating and removing a resin film from a molded resin article having a resin film on its surface, thereby recovering a raw-form of resin material, comprising the steps of:

first, crushing a molded resin article into a plurality of small pieces; and next, squeezing said plurality of small pieces by applying thereto compression impacts based on fine vibrations, and removing from time to time resin film coatings released by said squeezing.

8. A pulverizing and separating process for separating and removing a resin film from a molded resin article having a resin film on its surface, thereby recovering a raw-form of resin material, comprising the steps of:

pulverizing a molded resin article into a plurality of small pieces;

squeezing said plurality of small pieces by applying thereto compression impacts based on fine vibrations and removing from time to time resin film coatings released by said squeezing;

re-pulverizing said squeezed small pieces; and removing resin film coatings separated by said re-pulverization from the surface of said re-pulverized pieces.

9. A pulverizing and separating process as recited in claim 8 wherein said step of re-pulverizing said small pieces further comprises the step of regulating said re-pulverized pieces in terms of diameter such that their diameters lie within a given particle range.

10. A pulverizing and separating process as recited in claim 8 wherein the step of re-pulverizing said small pieces is repeated seriatim plural times.

11. A pulverizing and separating process as recited in claims 7 or 8, wherein said step of squeezing said plurality of small pieces is performed by impacts based on directional fine vibrations applied between compression impact-applying surfaces that are disposed in spaced apart, opposing relation to one another.

12. A pulverizing and separating process as recited in claims 7 or 8, wherein said step of squeezing said small pieces is repeated seriatim plural times.

13. A pulverizing, separating and size-regulating process for separating and removing a resin film from a molded resin article having a resin film on its surface, thereby recovering a raw-form of resin material, comprising the steps of:

first, crushing a molded resin article into a plurality of small pieces; and next, squeezing said plurality of small pieces by applying thereto compression impacts based on fine vibrations, and removing from time to time resin film coatings released by said squeezing from time to time; and next, polishing and size-regulating said small pieces from which said resin film coatings have been removed.

14. A pulverizing, separating and size-regulating process for separating and removing a resin film from a molded resin article having a resin film on its surface, thereby recovering a raw-form of resin material, comprising the steps of:

pulverizing a molded resin article into a plurality of small pieces;

squeezing said plurality of small pieces by applying thereto compression impacts based on fine vibrations, and removing from time to time resin film coatings released by said squeezing;

re-pulverizing said squeezed plurality of small pieces; and polishing and size-regulating said plurality of small pieces by applying thereto frictional crushing impacts based on fine vibrations.

15. A pulverizing, separating and size-regulating process for separating and removing a resin film from a molded resin article having a resin film on its surface, thereby recovering a raw-form of resin material, comprising the steps of:

pulverizing a molded resin article into a plurality of small pieces; squeezing said plurality of small pieces by applying thereto compression impacts based on fine vibrations, and removing from time to time resin film coatings released by said squeezing;

re-pulverizing said squeezed plurality of small pieces;

polishing and size-regulating said plurality of small pieces by applying thereto frictional crushing impacts based on fine vibrations; and discriminating said size-regulated material from resin film coatings separated by said size-regulation, thereby removing said resin film coatings.

16. A pulverizing, separating and size-regulating process as recited in claims 14 or 15, wherein said step of re-pulverizing said small pieces further comprises the step of regulating said re-pulverized pieces in terms of diameter such that their diameters lie within a given particle range.

17. A pulverizing, separating and size-regulating process as recited in claims 14 or 15, wherein the step of re-pulverizing said small pieces is repeated seriatim plural times.

18. A pulverizing, separating and size-regulating process as recited in claims 13, 14, or 15, wherein said step of squeezing said plurality of small pieces is performed by impacts based on directional fine vibrations applied between compression impact-applying surfaces that are disposed in spaced apart, opposing relation to one another.

19. A pulverizing, separating and size-regulating process as recited in claims 13, 14, or 15, further comprising the step of supplying a separation-accelerating liquid between said spaced apart compression impact-applying surfaces.

20. A pulverizing, separating and size-regulating process as recited in claims 13, 14, or 15, further comprising the step of removing resin film coatings released by said squeezing when said small pieces are squeezed.

21. A pulverizing, separating and size-regulating process as recited in claims 13, 14, or 15, wherein said step

29 of squeezing said small pieces is repeated seriatim plural times.

22. A pulverizing and separating apparatus, comprising:
- a crusher means for crushing material;
- an inner compression impact member having an inner compression impact surface;
- an outer compression impact member having an outer compression impact surface disposed in predetermined spaced apart opposition to said inner compression impact member;
- an inlet opening located above and between said inner and outer compression impact members for feeding a material crushed by said crushing means into a space between said inner and outer compression impact members;
- said inner compression impact member having a generally conical configuration and being oriented so that a narrow end thereof is proximal to said inlet opening and a broad end thereof is remote from said inlet opening;
- said outer compression impact surface having annular sidewalls disposed radially outwardly of and in encircling relation to said inner compression impact surface, said annular sidewalls being disposed in oblique relation to said inner compression impact surface and said annular sidewalls diverging from one another relative to said inlet opening;
- a housing to which said outer compression impact member is mounted;
- a pair of vibration-generating means mounted on said housing in diametrically opposed relation to one another to impart directional fine vibrations to said housing and hence to said outer compression impact member, said directional fine vibrations being controlled depending on the treatment, properties, and nature of said material.

23. A pulverizing and separating apparatus, comprising:
- an inner compression impact member having an inner compression impact surface and an outer compression impact member having an outer compression impact surface disposed in predetermined, spaced apart opposition to said inner compression impact member, at least one of said inner and outer compression impact members being provided with directional fine vibrations that are controlled depending on the treatment, properties and nature of said material;
- an inlet opening located above and between said spaced apart inner and outer compression impact surfaces for feeding a material to be treated;
- stirring and feeding means located with respect to an inlet portion between said compression impact surfaces for preventing or allowing the agglomeration or tightening of the materials to be treated;
- said directional fine vibrations being generated by a vibration-generating means;
- a base for supporting said inner and outer compression impact members, said stirring and feeding means, and said vibration-generating means; and
- vibration dampening means for substantially isolating said base from said vibration-generating means.

24. A pulverizing and granulating apparatus, comprising:
- an inner compression impact member having an inner compression impact surface and an outer compression impact member having an outer compression

30 impact surface disposed in predetermined, radially outwardly spaced apart relation to said inner compression impact surface;
- upper vibration-generating means disposed in predetermined relation to an outer periphery of said outer compression impact member for providing thereto directional fine vibrations that are controlled depending on the treatment, properties, and nature of said material;
- an inlet opening located above and between said spaced apart inner and outer compression impact surfaces for feeding a material to be treated;
- stirring and feeding means disposed in predetermined relation to an inlet portion between said compression impact surfaces, including said inlet opening, for preventing or allowing the agglomeration or tightening of the materials to be treated;
- a base for supporting said inner and outer compression impact members, said stirring and feeding means, and said upper vibration-generating means; and
- vibration dampening means for substantially isolating said base from said upper vibration-generating means.

25. A pulverizing and separating apparatus as recited in claim 19, further comprising:
- a polishing and size-regulating apparatus disposed in cooperative relation with said pulverizing and separating apparatus;
- said polishing and size-regulating apparatus including a stationary disc member and a stationary polishing and size-regulating means disposed on said stationary disc member, said stationary disc member having a central region in open communication with an inlet opening for material to be polished and size-regulated, and said stationary disc member being provided with a plurality of concentric rings of stationary pins;
- said polishing and size-regulating apparatus further comprising a rotatable disc member and a polishing and size-regulating means secured to said rotatable disc member for conjoint rotation therewith;
- a plurality of concentric rings of pins being mounted on said rotatably mounted disc member; and
- said polishing and size-regulating apparatus further comprising a sorting means that lies on an outer periphery of the combined fixed/movable pins for arbitrarily sorting out the material having a desired or lower particle size and which communicates with a discharge port, and removal means for removing the material having a desired or higher particle size through a removal port.

26. A pulverizing and separating apparatus as recited in claim 25, further comprising means interconnecting said removal port and said inlet opening so that material removed through said removal port may be fed back to said inlet opening.

27. A pulverizing and granulating apparatus as recited in claim 24, wherein said stirring and feeding means comprises a first inlet stirring blade rotationally driven within said inlet opening and a second inlet stirring blade rotationally driven in the vicinity of said inlet portion between said compression impact surfaces.

28. A pulverizing and granulating apparatus as recited in claims 23 or 24, wherein said inner and outer compression impact surfaces are in a combined conical or truncated-conical form, said outer compression impact surfaces being disposed radially outwardly of said inner compression impact surfaces.

29. A pulverizing and granulating apparatus as recited in claims 23 or 24, wherein said inner and outer compression impact surfaces are in a combined arched form, and are disposed in opposing relation to one another.

30. A pulverizing and granulating apparatus as recited in claims 23 or 24, wherein said inner and outer compression impact surfaces are in a combined conical or truncated-conical/arched form, and are disposed in opposing relation to one another.

31. A pulverizing and granulating apparatus as recited in claims 23 or 24, wherein the direction of said fine vibrations is a downward, circular direction.

32. A pulverizing and granulating apparatus as recited in claims 23 or 24, wherein the surface of said inner compression impact member to which said small pieces are fed is provided with a plurality of guide projections for guiding and feeding said small pieces to said inner compression impact surface.

33. A pulverizing and granulating apparatus as recited in claims 22, 23, or 24, further comprising means for applying directional fine vibrations to a first preselected compression impact member of said inner and outer compression impact members in a first direction and wherein vibrations in a common or opposite direction are provided to a second preselected compression impact member of said inner and outer compression impact members by said means for applying directional fine vibrations.

* * * * *